United States Patent
Alu et al.

(10) Patent No.: US 11,339,875 B2
(45) Date of Patent: May 24, 2022

(54) ANTI-THEFT AND ROLLAWAY PREVENTION MANUAL PARK RELEASE MECHANISM WITH ROTATING HANDLE

(71) Applicant: Kuster North America, Inc., Troy, MI (US)

(72) Inventors: Calogero Alu, Shelby Charter Township, MI (US); Brian Andrew Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 151 days.

(21) Appl. No.: 17/002,217

(22) Filed: Aug. 25, 2020

(65) Prior Publication Data

US 2021/0088137 A1  Mar. 25, 2021

Related U.S. Application Data

(60) Provisional application No. 62/904,282, filed on Sep. 23, 2019.

(51) Int. Cl.
*F16H 63/34* (2006.01)
*F16C 1/14* (2006.01)
*F16H 61/36* (2006.01)
*F16H 59/02* (2006.01)

(52) U.S. Cl.
CPC ........... *F16H 63/3491* (2013.01); *F16C 1/14* (2013.01); *F16H 61/36* (2013.01); *F16C 2361/65* (2013.01); *F16H 59/0278* (2013.01)

(58) Field of Classification Search
CPC .. F16H 63/3491; F16H 61/36; F16H 59/0278; F16C 1/14; F16C 2361/65; F16C 1/18; F16C 1/101; B60T 11/046; B60T 1/005
See application file for complete search history.

(56) References Cited

U.S. PATENT DOCUMENTS

| | | | |
|---|---|---|---|
| 3,310,995 | A | 3/1967 | Buchwald |
| 3,839,924 | A | 10/1974 | Schaefer |
| 5,187,999 | A | 2/1993 | Kobayashi et al. |
| 7,823,983 | B2 | 11/2010 | Inagaki et al. |

(Continued)

FOREIGN PATENT DOCUMENTS

| DE | 29520180 U1 * 12/1995 | ............... F16C 1/18 |
|---|---|---|
| WO | WO 2014051155 A1 * 3/2014 | ............... G05G 7/00 |

(Continued)

OTHER PUBLICATIONS

Machine translation of WO 2021094347 A1, Blucher et al., May 20, 2021 (Year: 2021).*

*Primary Examiner* — Vinh Luong
(74) *Attorney, Agent, or Firm* — Dinsmore & Shohl LLP

(57) ABSTRACT

A park release mechanism for a vehicle, including an upper housing and an assembleable lower housing. A cam with a projecting handle is arranged between the upper and lower housings and defines a range of pivotal rotation relative the housings. A cable is secured at one end to the cam and adapted to secure at an opposite end to a transmission of the vehicle. An unlock component is incorporated into the housing in communication with the cam and handle and, upon actuating, to shift the vehicle to and from a Park position upon actuation of the handle and displacement of the cable.

15 Claims, 29 Drawing Sheets

(56) References Cited

U.S. PATENT DOCUMENTS

| | | |
|---|---|---|
| 8,469,158 B2 | 6/2013 | Prat Terradas et al. |
| 9,021,917 B2 | 5/2015 | Koontz et al. |
| 9,423,019 B2 | 8/2016 | Albertson et al. |
| 9,927,028 B2 | 3/2018 | Shin et al. |
| 10,094,471 B2 | 10/2018 | DeVos et al. |
| 10,793,127 B2 * | 10/2020 | Alu .................. B60T 7/101 |
| 2002/0162709 A1 | 11/2002 | Drennen et al. |
| 2005/0034493 A1 | 2/2005 | Wittwer et al. |
| 2007/0039406 A1 | 2/2007 | Yamanaka |
| 2009/0151501 A1 * | 6/2009 | Jung .................. F16H 59/10 |
| | | 74/502 |
| 2012/0325572 A1 | 12/2012 | Morgese |
| 2014/0311269 A1 * | 10/2014 | Fournier ............ F16H 59/0278 |
| | | 74/473.3 |
| 2014/0326101 A1 | 11/2014 | Han et al. |
| 2015/0298663 A1 | 10/2015 | Tashiro |
| 2017/0009800 A1 * | 1/2017 | Lee .................. F16H 63/3491 |
| 2017/0138475 A1 | 5/2017 | Kim et al. |
| 2017/0343106 A1 | 11/2017 | Spooner et al. |
| 2018/0094724 A1 | 4/2018 | Devos et al. |
| 2018/0370501 A1 | 12/2018 | Singleton |
| 2020/0122701 A1 | 4/2020 | Alu et al. |
| 2020/0247358 A1 * | 8/2020 | Alu .................. F16C 1/12 |

FOREIGN PATENT DOCUMENTS

| | | | | |
|---|---|---|---|---|
| WO | WO 2017200535 A1 * | 11/2017 | ............ | B60K 20/02 |
| WO | WO 2021094347 A1 * | 5/2021 | ............ | F16H 63/34 |

\* cited by examiner

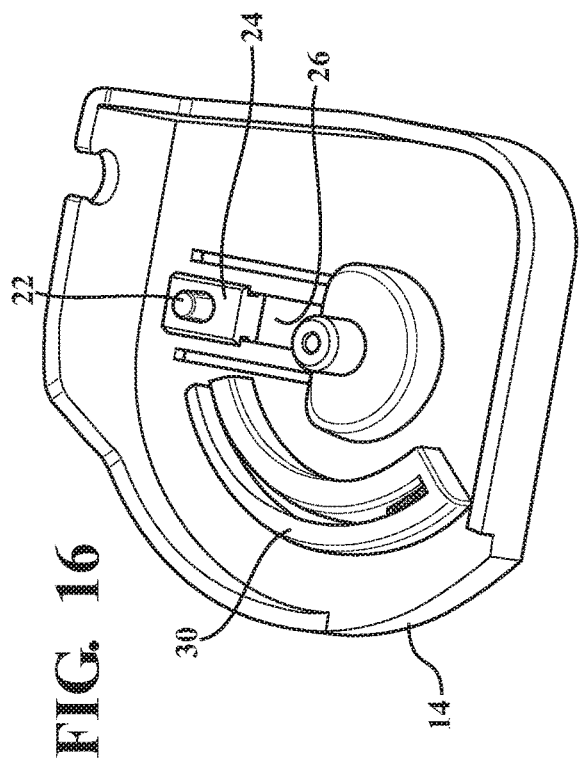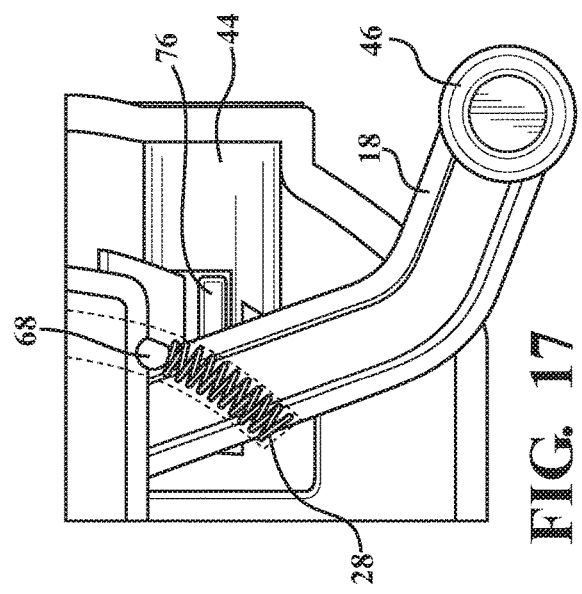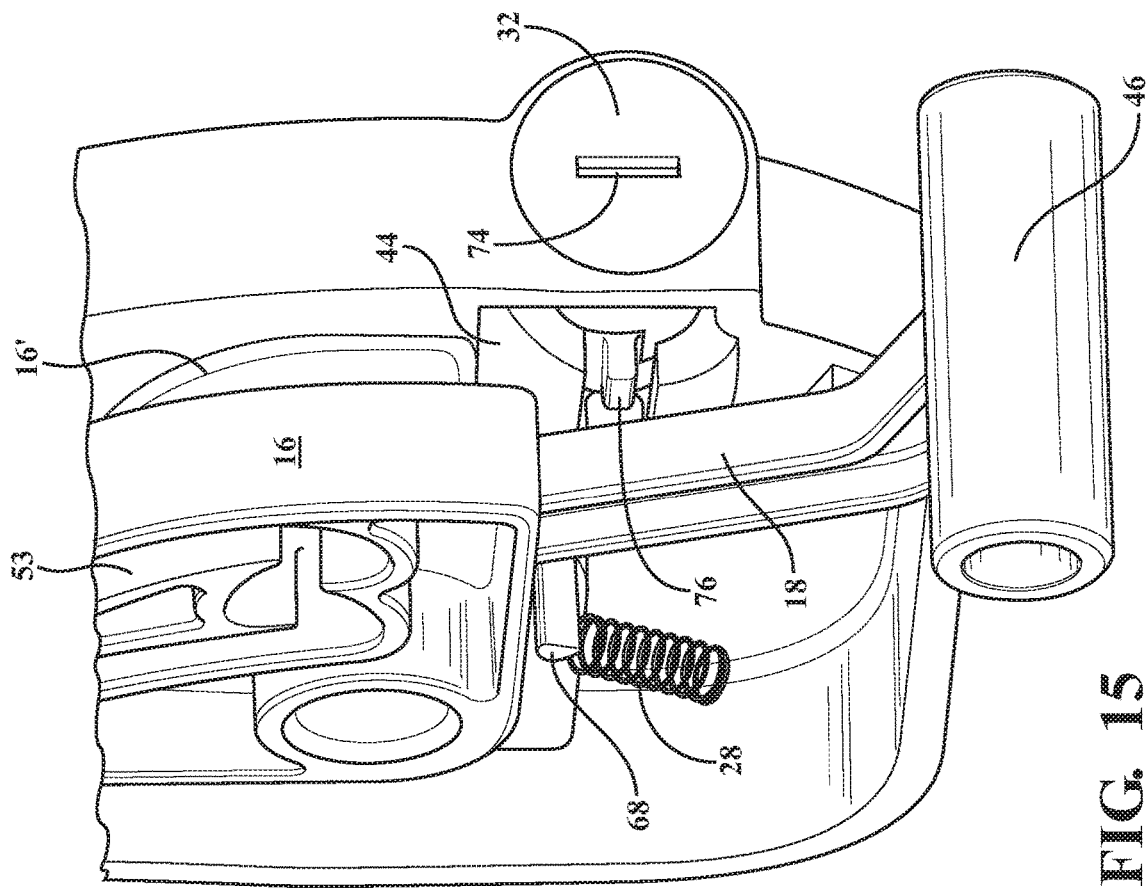

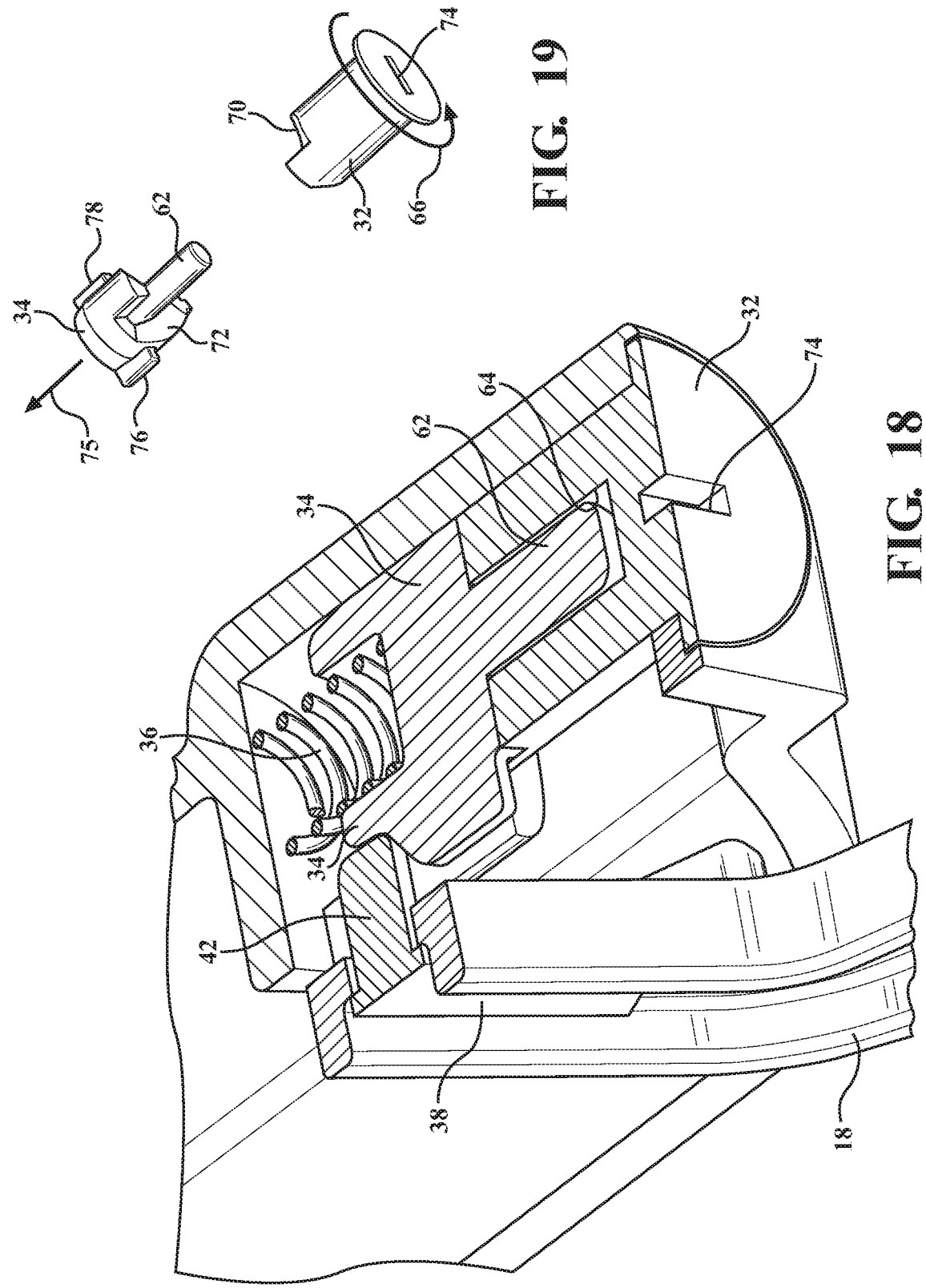

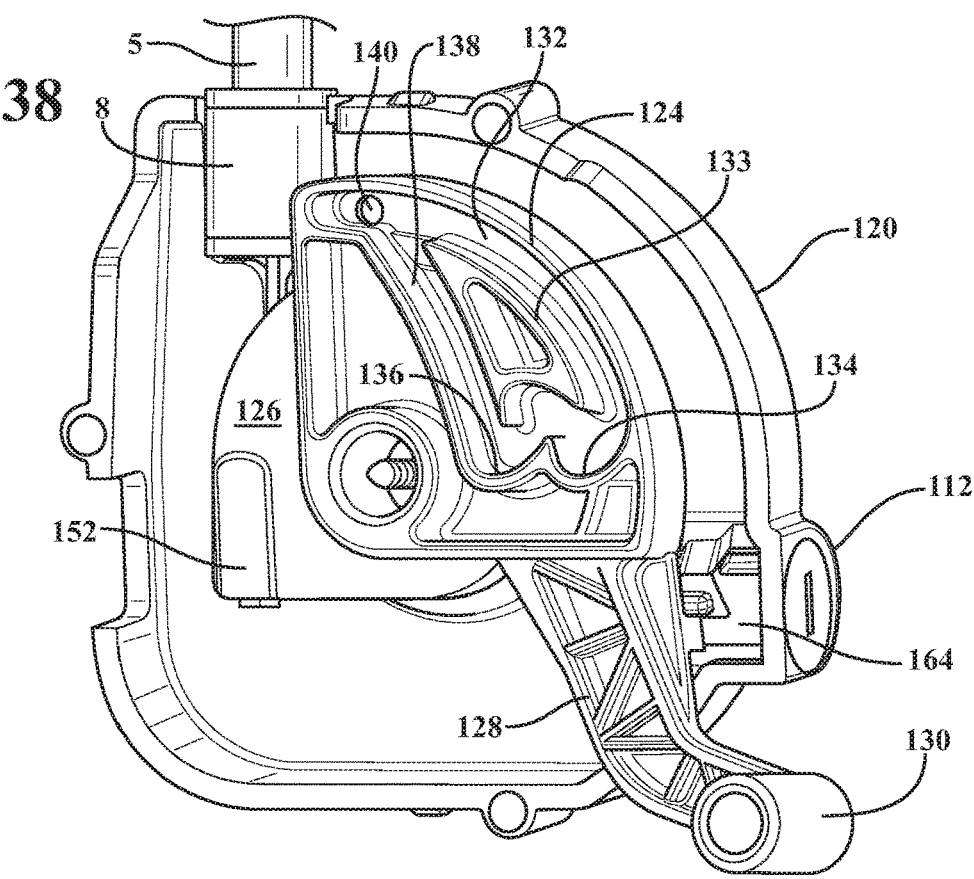

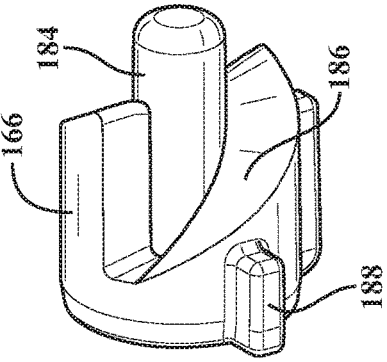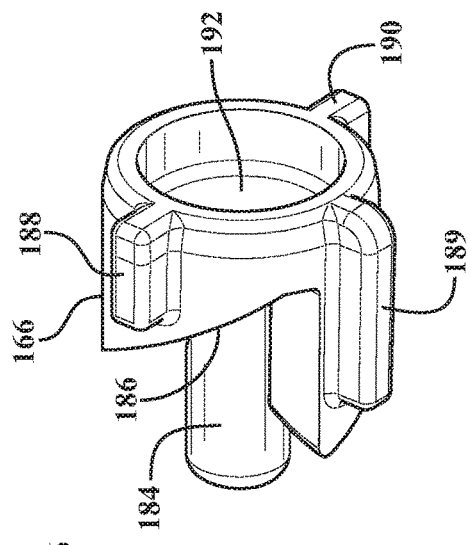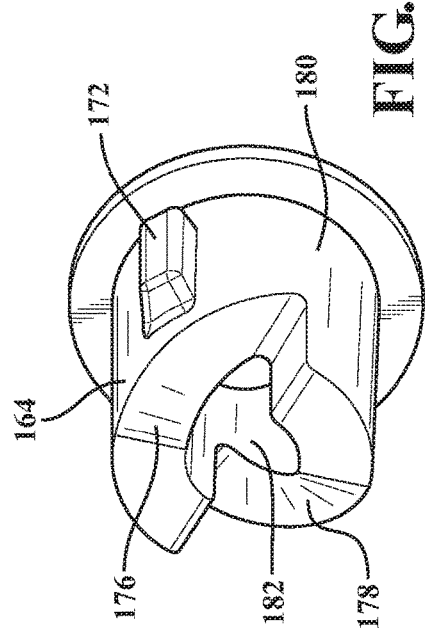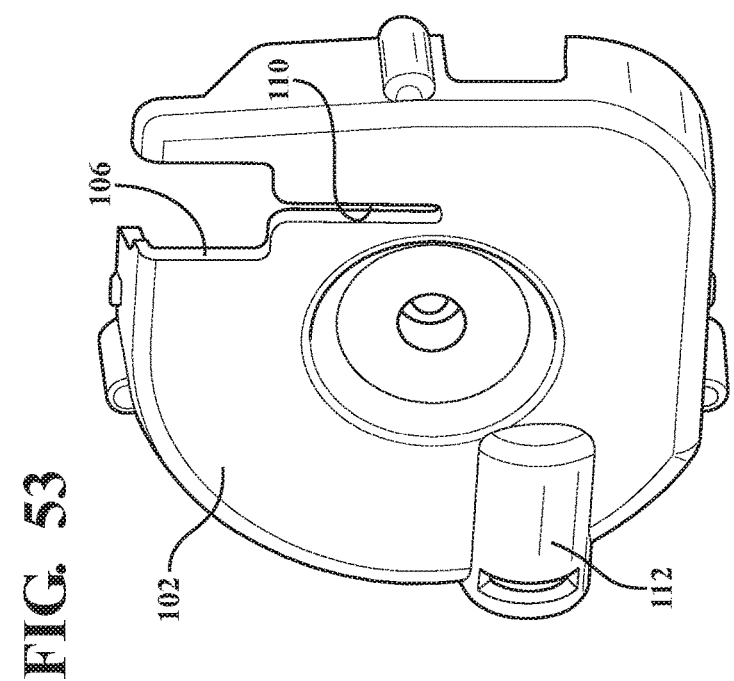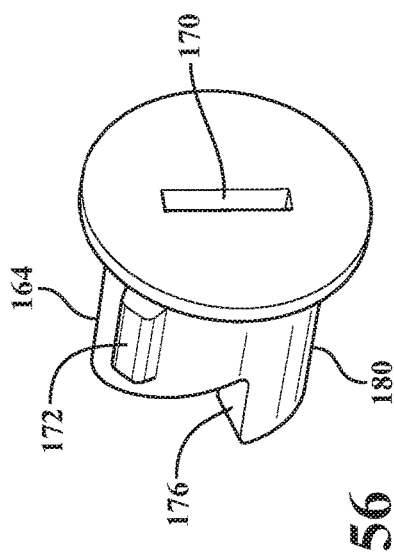

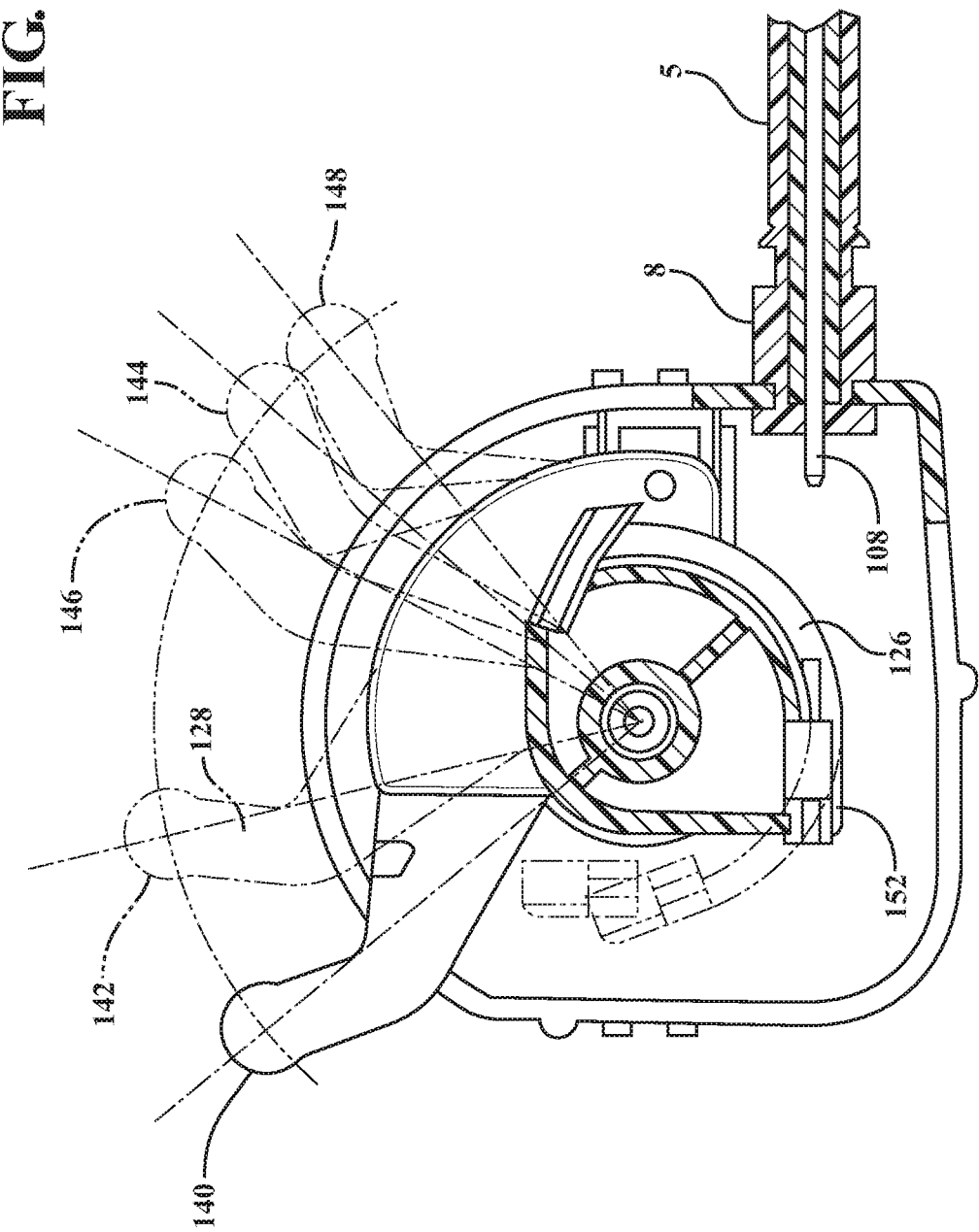

ANTI-THEFT AND ROLLAWAY PREVENTION MANUAL PARK RELEASE MECHANISM WITH ROTATING HANDLE

CROSS REFERENCE TO RELATED APPLICATIONS

The present application claims the priority of U.S. Ser. No. 62/904,282 filed Sep. 23, 2019.

FIELD OF THE INVENTION

The present invention relates generally to manual park release mechanisms. More specifically, the present invention discloses a manual park release mechanism for moving a vehicle from a park position, such as often resulting from an e-shifter becoming non-functional resulting from loss of power. When a vehicle loses electrical power or when the gear shift mechanism is not functional for any other reason, the mechanism allows the transmission to be shifted from Park to a Neutral position. The present mechanism additionally provides the additional function of anti-theft and rollaway prevention by requiring a lock to be disengaged in order to operate the mechanism.

BACKGROUND OF THE INVENTION

Parking release mechanisms are generally known in the art and which operate to engage and disengage the transmission from the park position during periods of time in which the vehicle loses power or the gear shift system is not functional, allowing the vehicle to be pushed or towed. Current technologies utilize any of a rigid handle or a tether. In the instance of a rigid handle, the user pulls to disengage the Park position.

As is further known, current lock mechanisms do not reposition the handle automatically after unlocking, and which further requires use of special tools or two hands to both hold the lock in an unlock position and to actuate the handle manually. Current technology further requires that the park release mechanism guarantee that the lock has been reengaged, as there is no identification if something has not been relocked.

Examples of existing Manual Park Release Mechanisms include that depicted in US 2018/0094724 to DeVos, and which discloses a handle assembly including a base, a handle pivotally connected to the base, and a lock piece. The handle is pivotable between an open position and a closed position, with the lock piece designed to selectively lock the handle in open position and to release the handle and allow it to pass back to closed position after the handle is pulled from lock position.

Additional features of the park release system in DeVos '724 include a cable connector assembly which includes a first cable section connectable to a second cable section. The second cable section includes a housing having a slider within a passageway and below a flexible retention beam. The slider is configured to receive and connect to the cable from the first cable section.

Another example from the prior art includes the Lee 2014/0326101 which teaches a cable pulling device having a base, a lever connected rotatably relative to the base and to which a cable is connected. A bar member and a spring member are also provided, the spring member being arranged between the lever and the bar member to pressurize the bar member toward the base, with the cable being pulled by standing up of the lever.

Also noted is the emergency release cable in Shin, U.S. Pat. No. 9,927,028 which teaches a lever bracket fixed to a position adjacent to a driver's seat. A handle lever is installed in the lever bracket so as to pivot around a pivot axis from a first position to a second position, wherein an end of the emergency release cable is fixed to the handle lever. A slider is provided having a lock protrusion for fixing the handle lever to the second position, and is linearly-movably coupled to the handle lever.

Other features include a spring finger fixed to the lever bracket, and engaged with the lock protrusion so as to block the handle lever from returning to the first position from the second position. A guide pin prevents the handle lever from being separated from the lever bracket, and pivotably supporting the handle lever.

Upon the handle lever being pivoted from the first position to the second position, the emergency release cable is pulled to switch the automatic transmission from the parking position to the neutral position. When the handle lever is pivoted to the second position, the lock protrusion and the spring finger are engaged to fix the handle lever to the second position and when a tension exceeding a predetermined magnitude is applied to the emergency release cable after the handle lever is fixed to the second position, the engagement between the lock protrusion and the spring finger is released while the slider is linearly moved in a direction away from the pivot axis.

Other references of note include each of including the manual cable release of Drennen US 2002/0162709 (Delphi), the manual park lock release of Kobayashi U.S. Pat. No. 5,187,999, the park brake apparatus of Yamanaka US 2007/0039406, and the locking system of Wittwer US 2005/0034493.

SUMMARY OF THE INVENTION

The present invention seeks to overcome the shortcomings of the prior art by providing a park release mechanism having upper and lower housings which sandwich therebetween a cam with projecting handle. A closed profile exhibited on a surface of the cam receives a projecting portion of a CAM profile guide component displace-ably mounted within a linear slot associated with the lower housing and, in combination with a compression spring supported within an arcuate track of the lower housing, facilitates cycling of the cam and integrated handle between successive positions for removing the vehicle from a Park position to a Neutral lockout position, and such as upon loss of power or other failure condition of the main shifter.

A combination lock and slider is incorporated into the upper housing and, upon being rotatably displaced (such as a quarter turn) results in a splined surface or other like wedge interface established therebetween a laterally displacing and biasingly supported spring lock to be counter-biased in an unseating direction from a retaining pocket formed in the upper housing. At this point the handle is unlocked and the spring causes the cam and integrated handle to pivot a nominal rotational distance to take up the slack on a release cable extending through attachable lower and upper cable assemblies extending from a vehicle transmission to a handle mechanism within which is mounted the cam and to permit the integrated handle thereafter to be further actuated out of the Park position, this again caused by displacement of the cable secured to the pivotal cam for holding the transmission out of the Park position, and as influenced by the linear slot displacing guide component traveling within the closed cam profile communicating with the linear slot of the upper housing.

Reverse manipulation of the handle causes the cam and pivotally supported cable to return toward the Park position, the handle further required to be pressed downwardly to complete resetting by compressing the spring and returning the handle to the locked (Park) position. In this manner, and in the instance of a user attempting to actuate the handle without completing resetting in the locked/Park position, the spring lock arm of the mechanism will not re-engage the receiving pocket in the lower housing, thereby preventing occurrence of an unintentional out of Park position.

BRIEF DESCRIPTION OF THE DRAWINGS

Reference will now be made to the attached drawings, when read in combination with the following detailed description, wherein like reference numerals refer to like parts throughout the several views, and in which:

FIG. 15 is s substantial repeat of the illustration of FIG. 6 and additionally showing the compression coil spring which is biased by a pin feature of the handle in the locked/Park position;

FIG. 16 is a rotated illustration of the lower housing shown in FIG. 5 and better depicting the features of the guide component with projecting portion displace-ably mounted within a linear slot associated with the lower housing and, in combination with a compression spring supported within an arcuate track of the lower housing, facilitates cycling of the handle between locking and unlocking positions for removing the vehicle from Park position;

FIG. 17 is a side plan view of the mechanism as depicted in FIG. 15 with the lower housing depicted in phantom and again showing the pivoting handle with pin feature seating the compression coil spring in the locked/Park position;

FIG. 18 is a repeat of the enlarged sectional perspective of FIG. 11;

FIG. 19 is a rotated and enlarged partial exploded view of the rotating lock and slider components of FIG. 5 and better showing the wedge interface for causing the slider to telescope in a compressing direction against a coil spring supported against an inner end of the slider concurrent with laterally displacing the spring lock arm of the handle;

FIG. 38 is a further side plan view of the handle assembly and with the lower housing cover, CAM follower guide component and compression spring removed and depicting the engagement of the extending end of the upper cable assembly through the access window defined in the upper housing cover and to the cam component;

FIG. 39 is a further succeeding view of FIG. 38 with the cam component removed and depicting the upper housing cover in combination with the lock and slider components;

FIGS. 51-53 presents a series of first plan, side and second plan views, respectively, of the upper housing cover similar to FIG. 39 and depicting the access window for receiving the translatable extending end of the upper cable assembly for guided attachment to the secondary offset cam portion, in combination with the receiving configuration for supporting the rotatable lock and slider components;

FIGS. 54-55 depict a pair of front and rear perspective views of the linearly displaceable slider component and FIGS. 56-57 further depict a corresponding pair of views of the rotatable lock component in co-acting splined surface interface with the slider component as previously shown in FIGS. 40-41;

FIG. 60 is a diagrammatic view of a handle mechanism portion of the overall assembly according to one non-limiting variant and showing the various cam and handle positions between each of the initial unlock position, secondary lockout wall position, Neutral lockout position, secondary unlock position, return to initial unlock position and Park reset position.

DETAILED DESCRIPTION OF THE PREFERRED EMBODIMENTS

With reference to the attached illustrations, the present invention discloses a park release mechanism, variants of which are initially generally depicted at 10 in FIGS. 1-32 and subsequently at 100 in succeeding FIGS. 33-57. As further depicted in FIGS. 58-59, the park release mechanism (again shown at 100 in FIG. 59) is integrated into a manual park release assembly extending from a remote positioned vehicle transmission to the park release mechanism.

Figure 58:
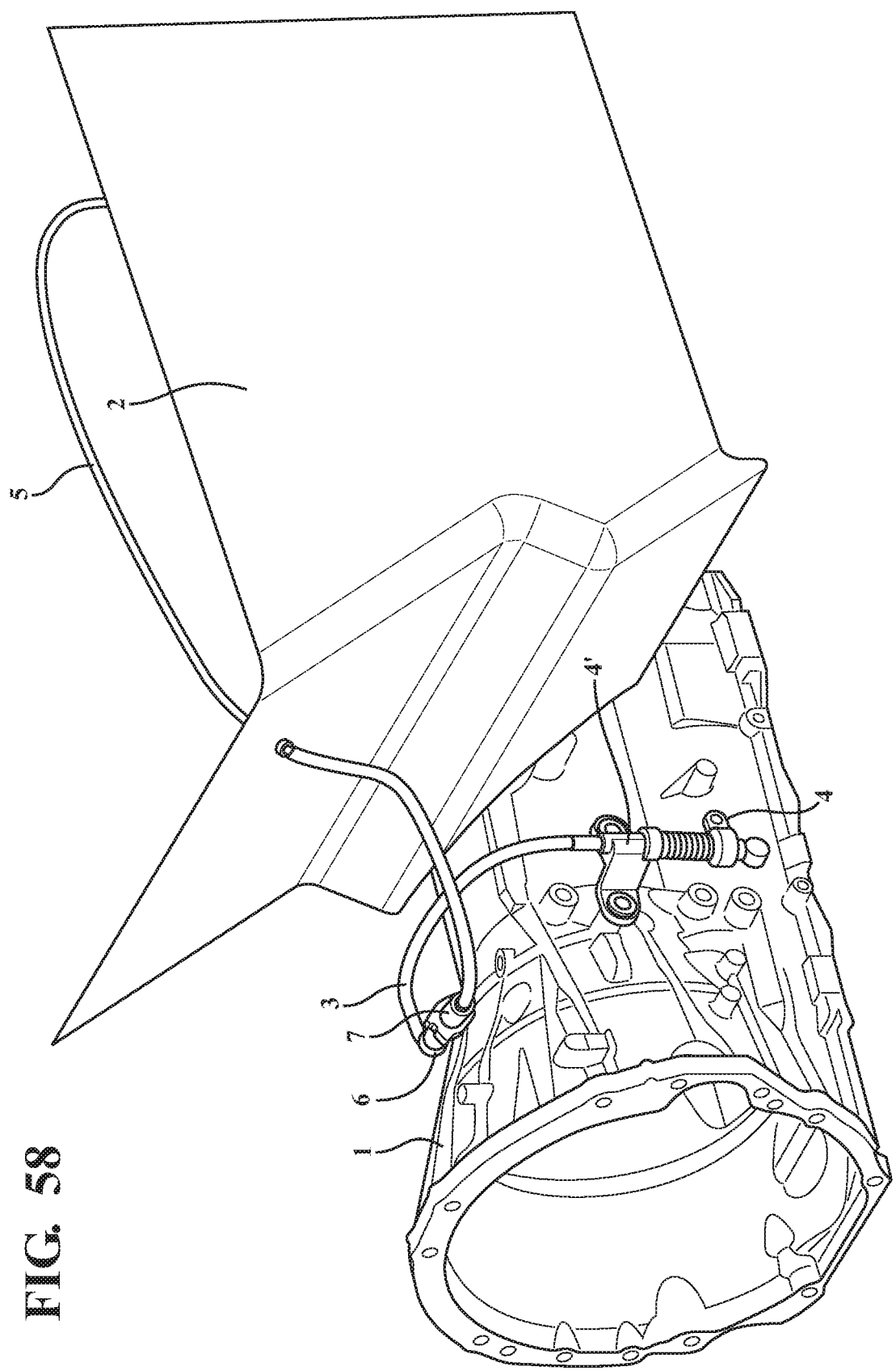
FIG. 58 is a first overall environmental view depicting the transmission side of the manual park release assembly and showing each of the lower cable assembly secured to the transmission and the upper cable assembly interconnected to the lower cable assembly via opposing mid-connection portions.

FIG. 58 is a first overall environmental view depicting the transmission side (see transmission 1 located in the engine or other exterior compartment of the vehicle and separated from an interior passenger compartment via an enclosure defining foot well or other like partition 2) of the manual park release assembly. A lower cable assembly 3 is provided and is attached to the transmission by such as a transmission select lever 4 which includes a slotted hole for mounting to a shaft of the transmission. Also depicted is a transmission bracket 4' which mounts the associated cable 3 to the transmission 1, the operation of which is such that it rotates under normal transmission shifter functioning. An upper cable assembly 5 is interconnected to the lower cable assembly via opposing mid-connections (respectively depicted at 6 and 7).

In response to a separate actuation by the manual park release mechanism 10, 100, the select lever 4 results in transfer of the force/motion from the displacing core wire extend between the manual park release mechanism and the transmission lever 4 for manually shifting the transmission to the out of Park position, and in instances of such as an electrical failure in the vehicle and/or any other mechanical issue which prevents normal shifter functionality.

Figure 59:
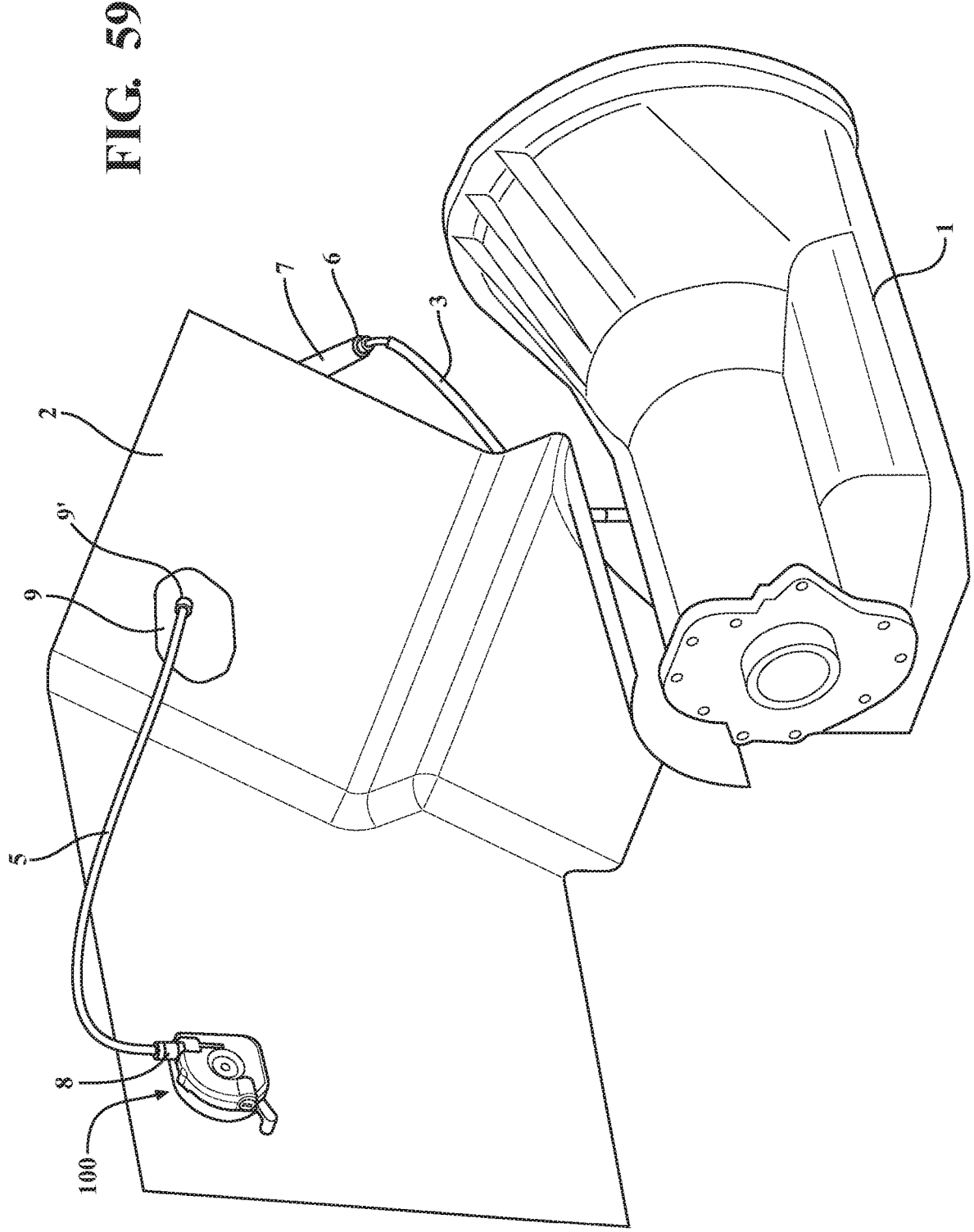
FIG. 59 is a second overall environmental view depicting the passenger interior side including an example of a non-limiting mounting location for the park release handle mechanism to which is engaged an extending end of the upper cable assembly with inner translating wire.

As further shown in FIG. 59, a second overall environmental view depicts the passenger interior side including an example of a non-limiting mounting location for the park release handle mechanism 100 to which is engaged an extending end 8 of the upper cable assembly 5 with inner translating wire (see as further described below) which extends through the upper and lower cable sub-assemblies between the transmission and the park release mechanism. A further guide aperture (see inner closed rim 9') is configured within a bracket 9 on the dividing wall 2 to provide structural support for the upper cable assembly 5 and to ensure unobstructed linear travel of the inner cable in response to actuation of the park release mechanism.

Referring now to the initial variant 10 of the park release mechanism, such as depicted in FIGS. 1-5, a housing enclosure includes each of an upper housing portion 12 and a lower housing portion 14, these being inter-assembled in a sandwich arrangement through the use of any suitable clips, tabs or other structure and in order to define a package interior space for rotatably supporting a cam component 16 (see FIG. 5) having an integrated and projecting handle 18. As shown in the illustration of the cam component in FIG. 30, a closed profile or interior track 20 is exhibited on a surface of the cam 16 which receives a projecting portion 22 of a CAM profile guide component 24 (see again as best shown in the exploded view of FIG. 5) displace-ably mounted within a linear slot 26 (see also FIG. 16) associated with the lower housing 14. In combination with a compression spring (see at 28 in FIGS. 15 and 17) supported within an arcuate track 30 of the lower housing 14, the displacement of the guide component 22 occurs simultaneously across along the arcuate profile of the track 20 and along the linear slot 26 of the in the lower housing 14 to facilitate cycling of the handle 18 between locking and unlocking positions for removing the vehicle from the Park position upon loss of power or other failure of the main shifter (not shown). As will be further described, the cam component 16 further includes an offset portion 16' to which the extending end of the inner translating cable (see as further described at 48 below) is attached, with the closed profile 20 configured to include a series of arcuate bends which coordinate with the overlapping dimension of the linear slot 26 to guide the motion of the guide component 24.

Figure 11:
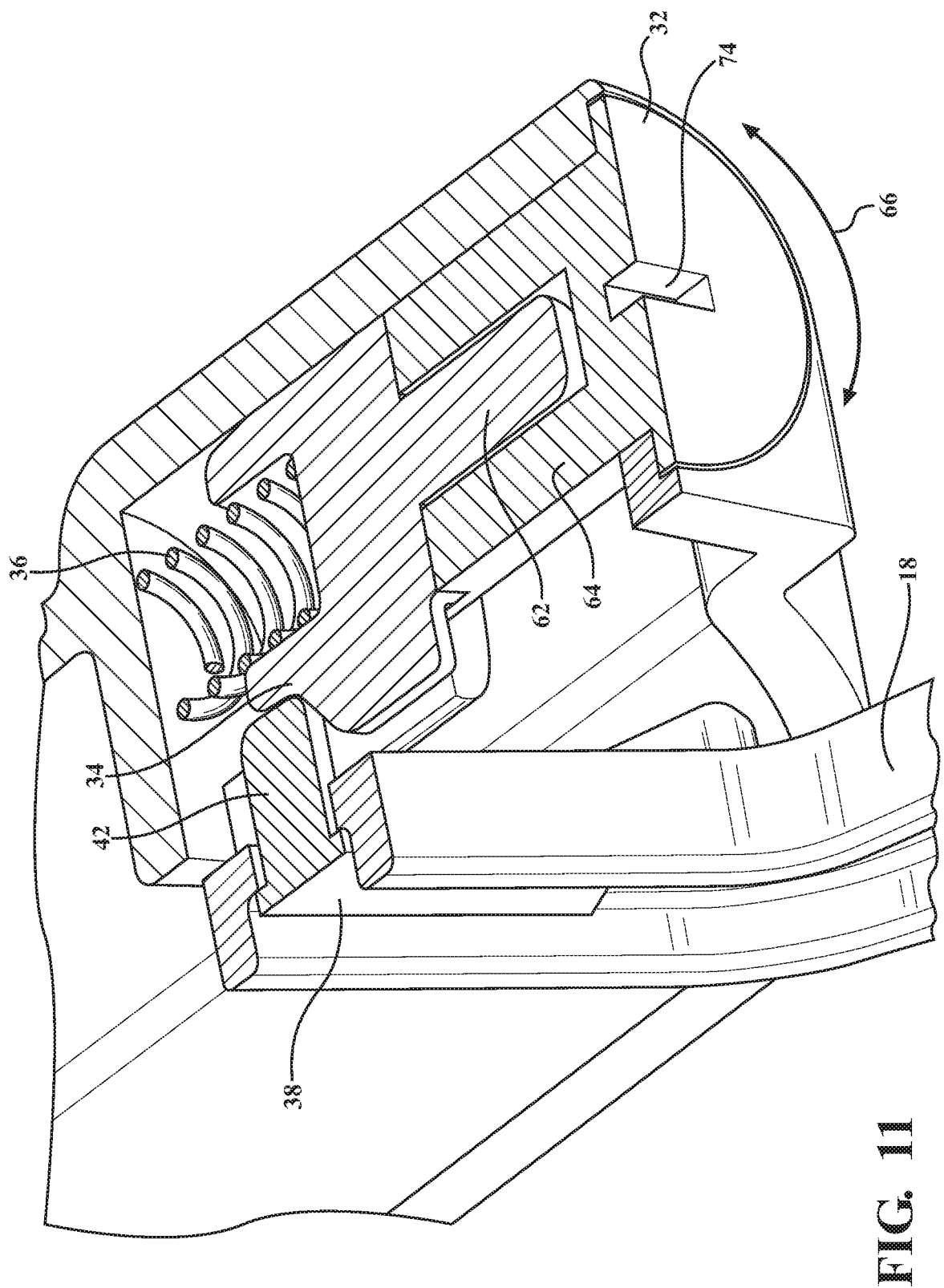
FIG. 11 is a further enlarged sectional perspective of the spring lock arm and cam handle interfacing with the upper housing supported lock and slider in the locked/Park position.

A combination lock component 32 (such as which is key activated) and linearly actuated slider 34 (also termed an unlock component) is incorporated into the upper housing 12 and, upon being rotatably displaced (such as a quarter turn) results in a wedge interface established therebetween causing the slider 34 to displace against an inner supporting coil spring 36 (see as best shown in FIG. 11) laterally displacing a biasingly supported spring lock arm 38 (depicted in FIG. 31 to include the linear arm 38 extending within open channel 40 configured in the handle 18 and including an end projecting portion 42) to become counter-biased unseated from a channel configured in a retaining pocket 44 (see FIGS. 7-8) formed upon an inside of the upper housing 12 in combination with an outer pseudo-cylindrical protuberant profile 45 of the upper housing 12.

At this point, the cam and arm are unlocked permitting an end situated crosswise gripping portion 46 of the handle 18 to pivot a nominal rotational distance (FIG. 23) to take up the slack on a release cable 48 (see as shown in FIG. 5 and as further again described in the transmission views of FIGS. 58-59) mounted to the cam 16 and extending to the remote transmission 1 of the vehicle (not shown) to permit the handle thereafter to be further actuated out of the Park position, this again caused by displacement of the cable (3, 5) secured to the pivotal cam for holding the transmission out of the Park position, and as influenced by the linear slot displacing guide component 24 traveling within the closed cam profile 20 of the lower housing 14.

Reverse manipulation of the handle end portion 46 causes the cam 16 and an end-most extending inner translating portion 48 (FIG. 5) of the cable (see again at 5 in FIG. 59) to return toward the Park position, the handle further required to be pressed downwardly to complete resetting by compressing the spring 28 and returning the handle to the locked (Park) position. In this manner, and in the instance of a user attempting to actuate the handle 18 without completing resetting in the locked/Park position, the spring lock arm 38 of the mechanism will not re-engage the receiving pocket in the lower housing, thereby preventing occurrence of an unintentional out of Park position.

FIG. 1 again illustrates a perspective view of the anti-theft and rollaway prevention manual park release mechanism. Additional features include an arcuate open channel which is defined between opposing inner edge 50 (for assemble-able half 12) and opposing edge 51 (for half 14), and through which projects the arm 18 of the cam 16 and to permit the user to grasp the end supported handle 46. Although not clearly shown, any arrangement of opposing engaging structure can be integrated into either of the opposing housings 12/14, such including snaps, tabs, etc., for assembling together. The upper 12 and lower 14 housings each further exhibit a package defining interior for receiving the cam 16 and projecting arm 18 and can be constructed of any suitable material not limited to a polypropylene.

Figure 1:
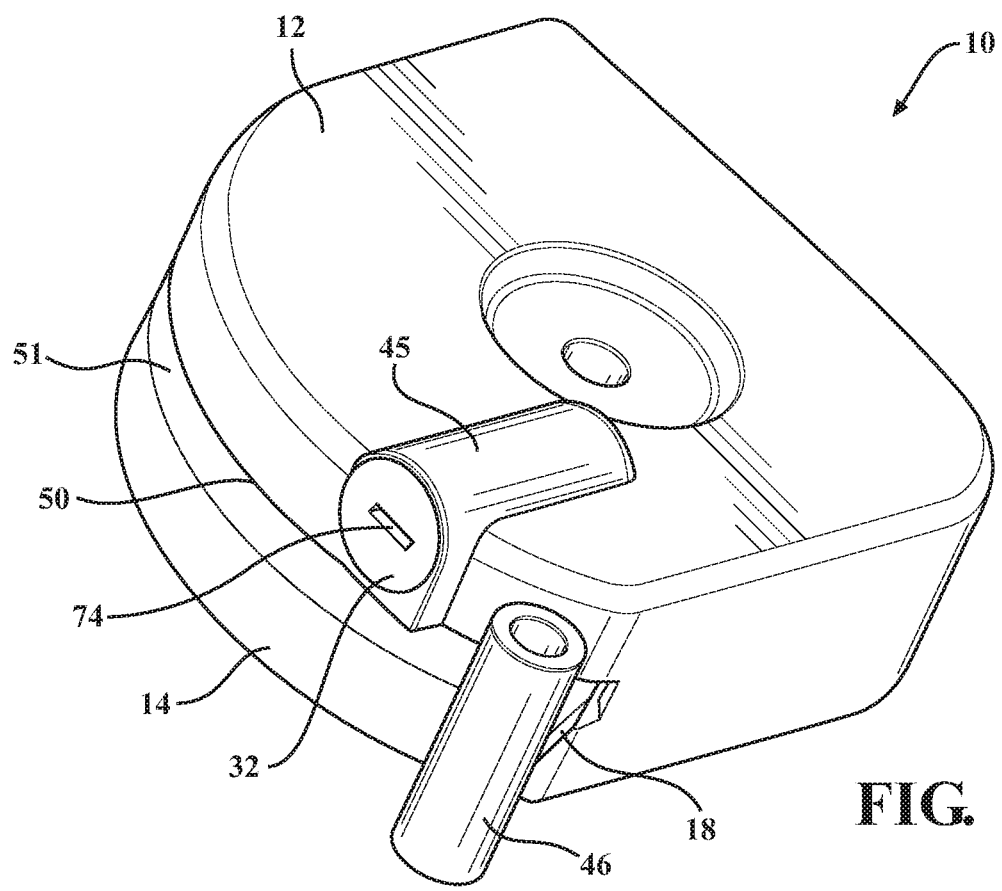
FIG. 1 is a perspective view of the anti-theft and rollaway prevention manual park release mechanism.
Figure 2:
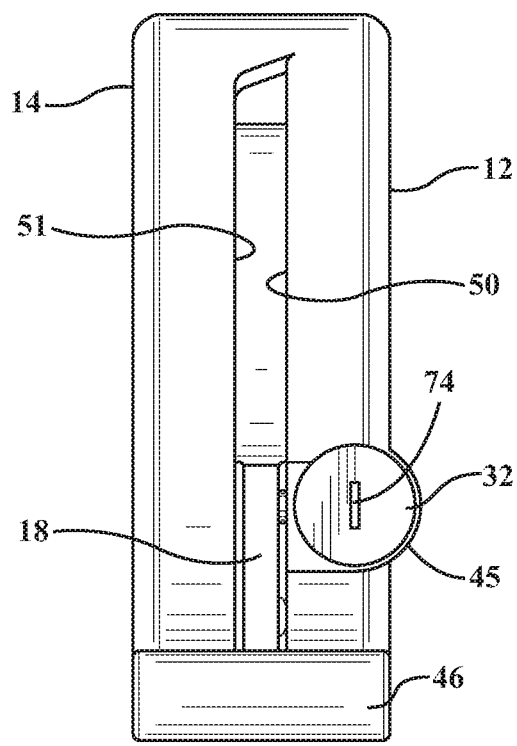
FIG. 2 is a front plan view of the release mechanism with the handle indicated in a park position.
Figure 3:
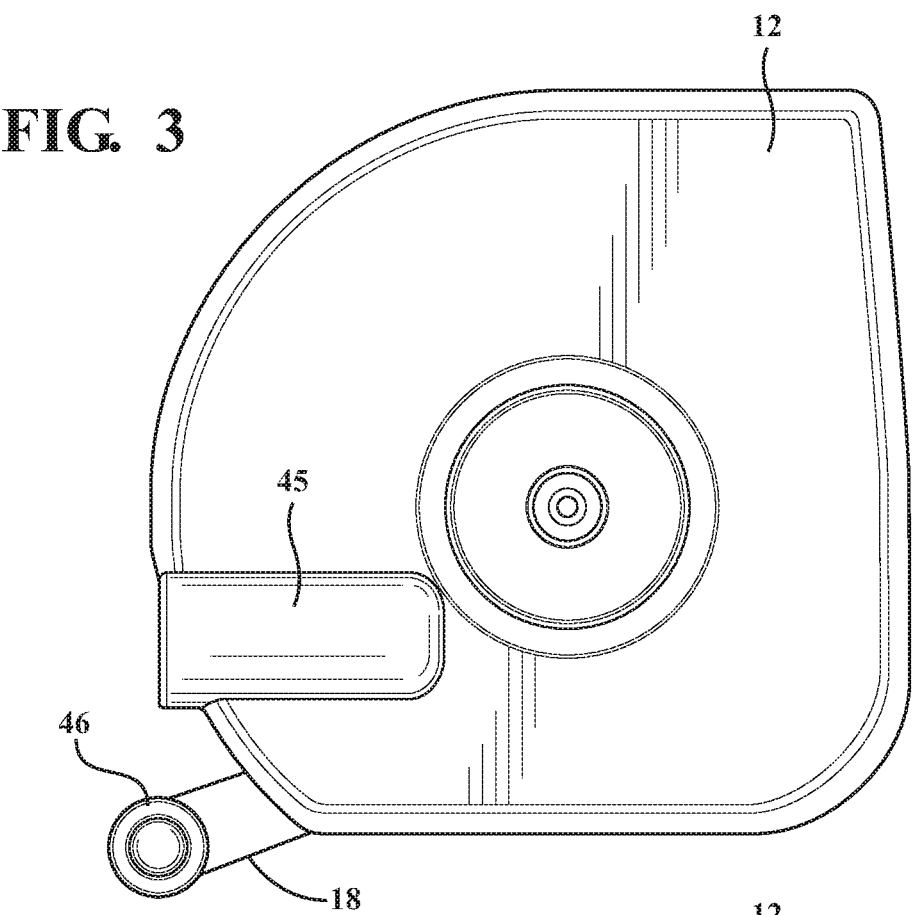
FIG. 3 is a rotated side plan view of FIG. 2.
Figure 4:
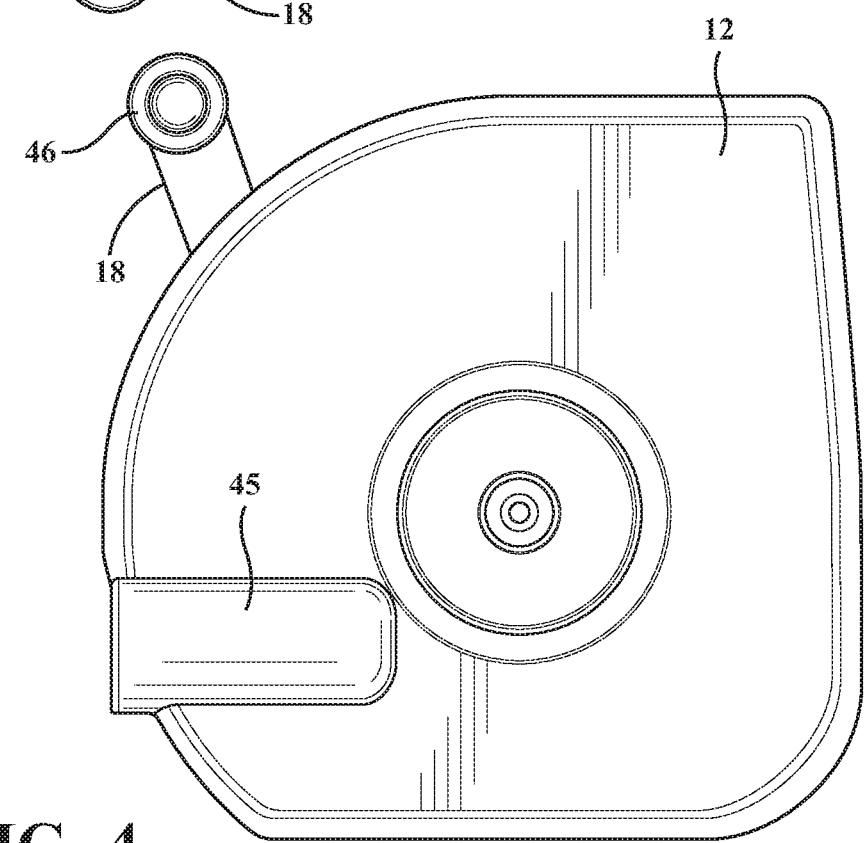
FIG. 4 is a further side plan view of the handle rotated to a Park release (i.e. Neutral) position.
Figure 5:
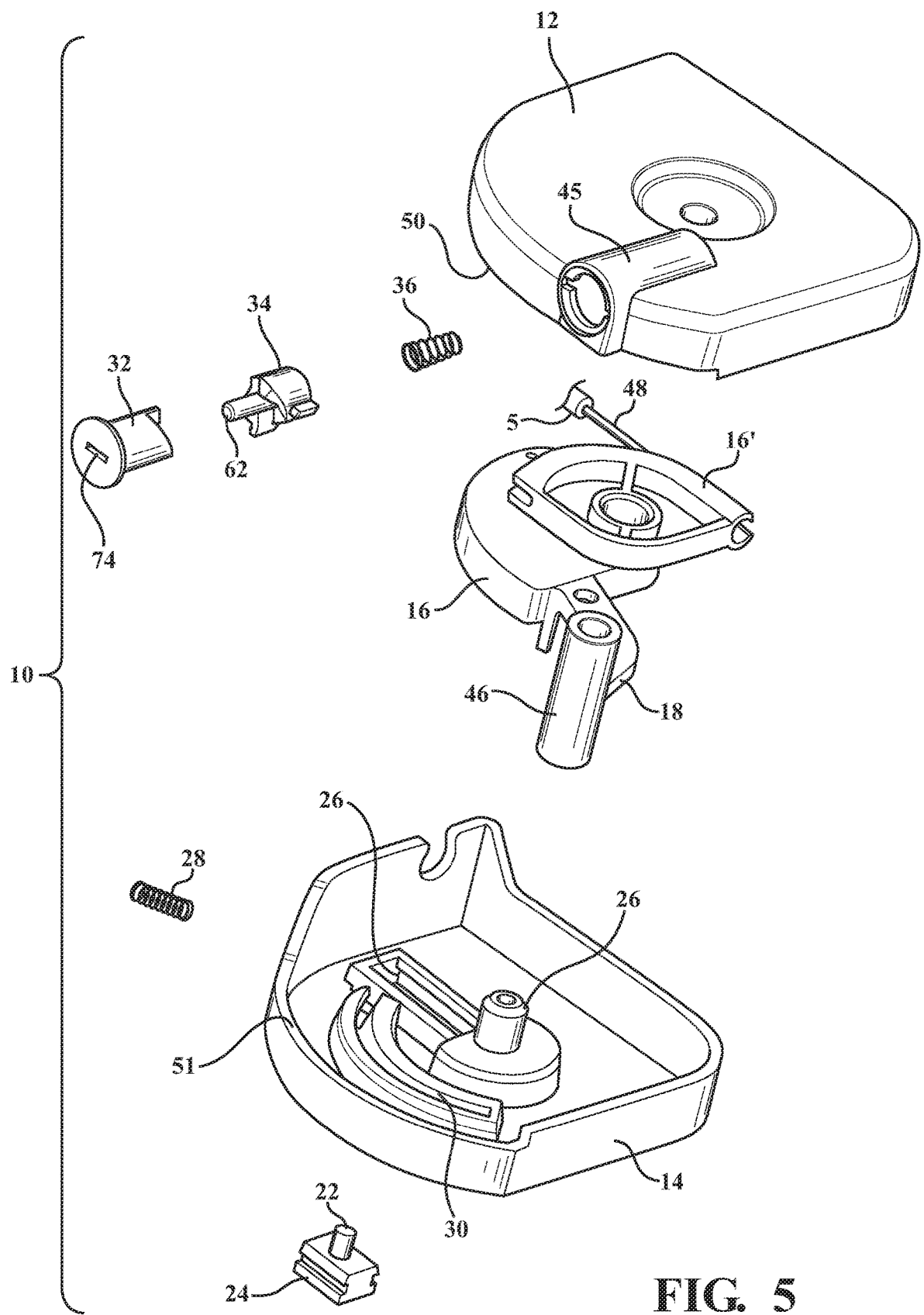
FIG. 5 is an exploded view of the manual park release mechanism and including each of the upper and lower housings, combined handle and cam follower with integrated spring arm, and inter-rotationally supported lock and slider exhibiting wedge interface for influencing the spring arm out of engagement with the lower housing.

Referring to FIG. 2, a front plan view of the release mechanism is shown with the handle indicated in a park position, with FIG. 3 providing a rotated side plan view of FIG. 2 in a similar handle position, and FIG. 4 a further side plan view of the handle 46 rotated to a Park release (i.e. Neutral) position.

FIG. 30 again provides a rotated view of the combined handle 18 and cam component 16 from a reverse side as compared to that shown in FIG. 5 and again further showing the reverse facing closed profile (referenced at 20) for seating the projecting portion 22 of the slot supported guide component 24 associated with the lower housing and, again in combination with the compression spring 28 supported within the arcuate track 30 of the lower housing portion 14, facilitates cycling of the handle 46 between locking and unlocking positions for removing the vehicle from Park position.

Figure 30:
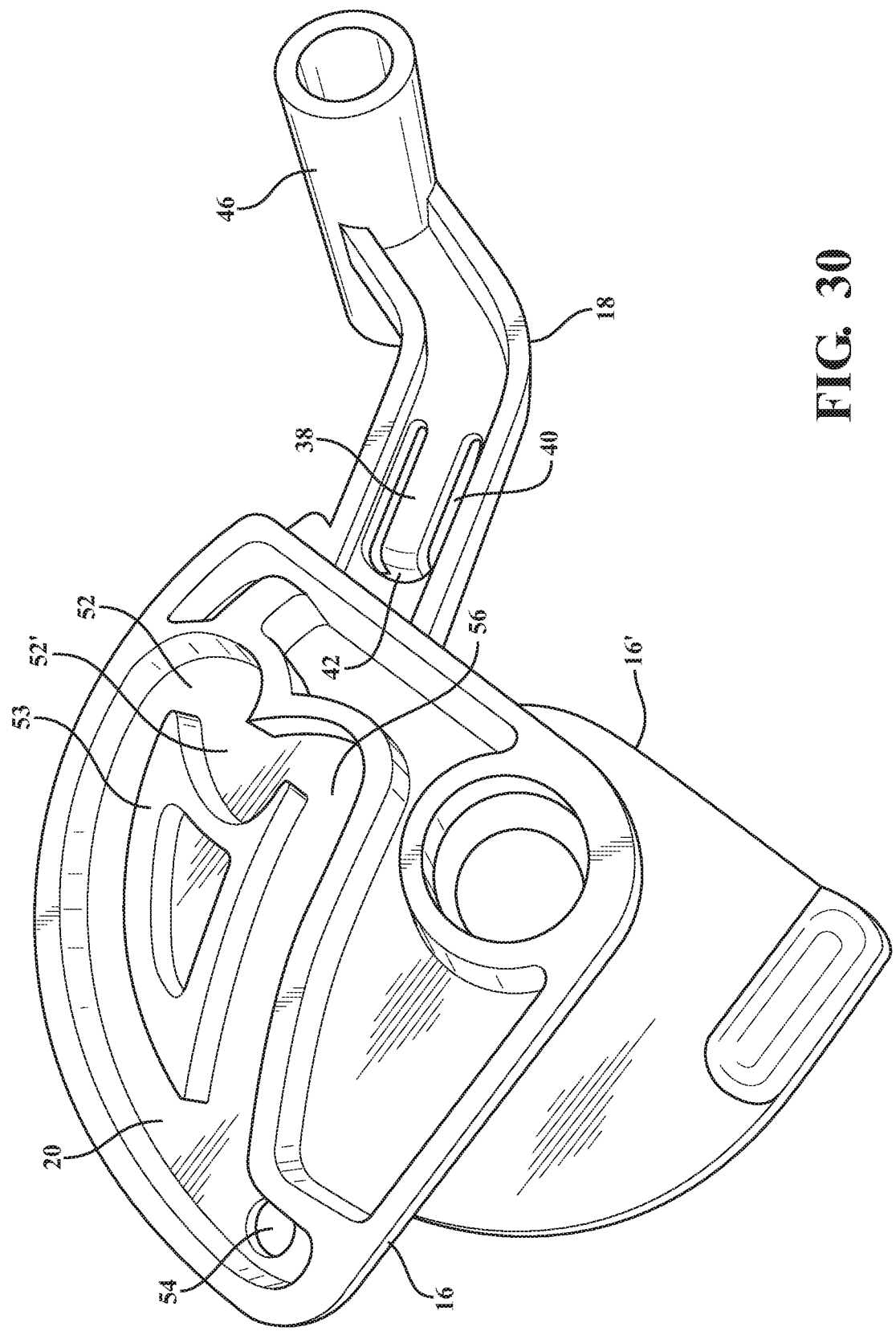
FIG. 30 is a rotated view of the combined handle and cam component from a reverse side as compared to that shown in FIG. 5 and further showing the reverse facing closed profile for seating the projecting portion of the guide component with projecting portion displace-ably mounted within a linear slot associated with the lower housing and, in combination with a compression spring supported within an arcuate track of the lower housing, facilitates cycling of the handle between locking and unlocking positions for removing the vehicle from Park position

As further shown, the closed profile 20 in FIG. 30 defines a closed track (this captured within an arcuate and multi-sided inner embossed portion 53 seated within the track 20) and within which the CAM profile guide component 24 is slaved. In a typical operation, initiates a position 54 corresponding to the Park position of the vehicle (FIGS. 2-3), with the out of Park lockout position referenced at position 52' once preceding position 52 is overcome and to avoid the handle from returning to the "unlock" position (this corresponding with rotation of the offset body portion of the cam 16 which receives the inner translating end portion 48 of the cable 5 in FIG. 5) and by which the cable is translated in order to hold the vehicle transmission out of the Park position (e.g. to the Neutral lockout position). Upon initially resetting the handle back toward the Park position, the guide component 24 is caused to travel in a reverse circuitous route within the track 20 to further location 56, at which point the handle 48 is pressed downwardly to recompress spring 28 and to return the cam to the locked/Park position (again at 54). Absent this last step, the mechanism will not reengage the secondary lock preventing the occurrence of a manual park release out-of-Park position, projecting portion 22 of guide component 24 remaining in the track between 56 and 56', without the operator pressing the handle into the locked position (again at 54).

Figure 31:
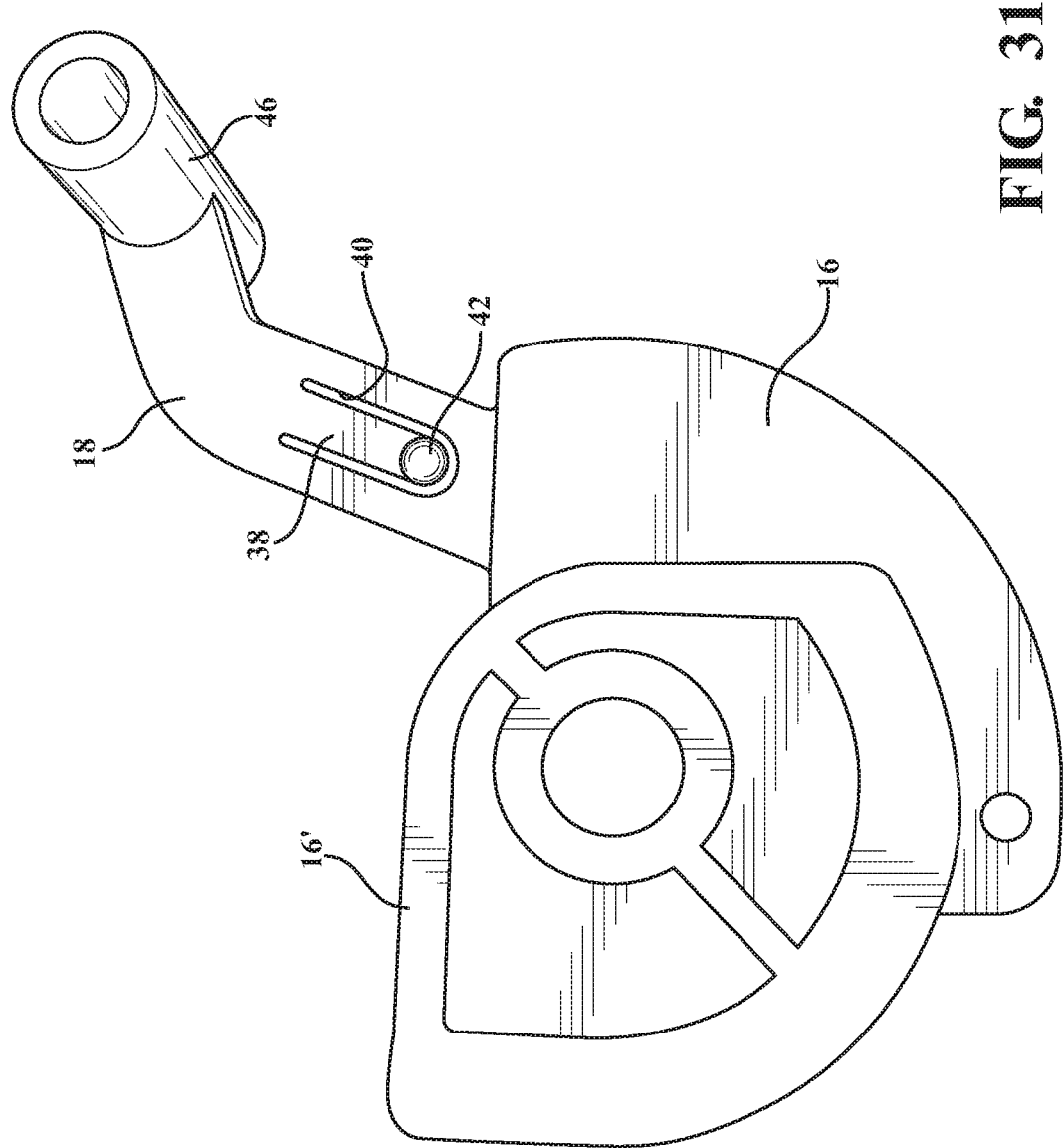
FIG. 31 is a reverse view of the handle and cam of FIG. 30 and again illustrating the spring lock arm integrated into the handle portion.
Figure 32:
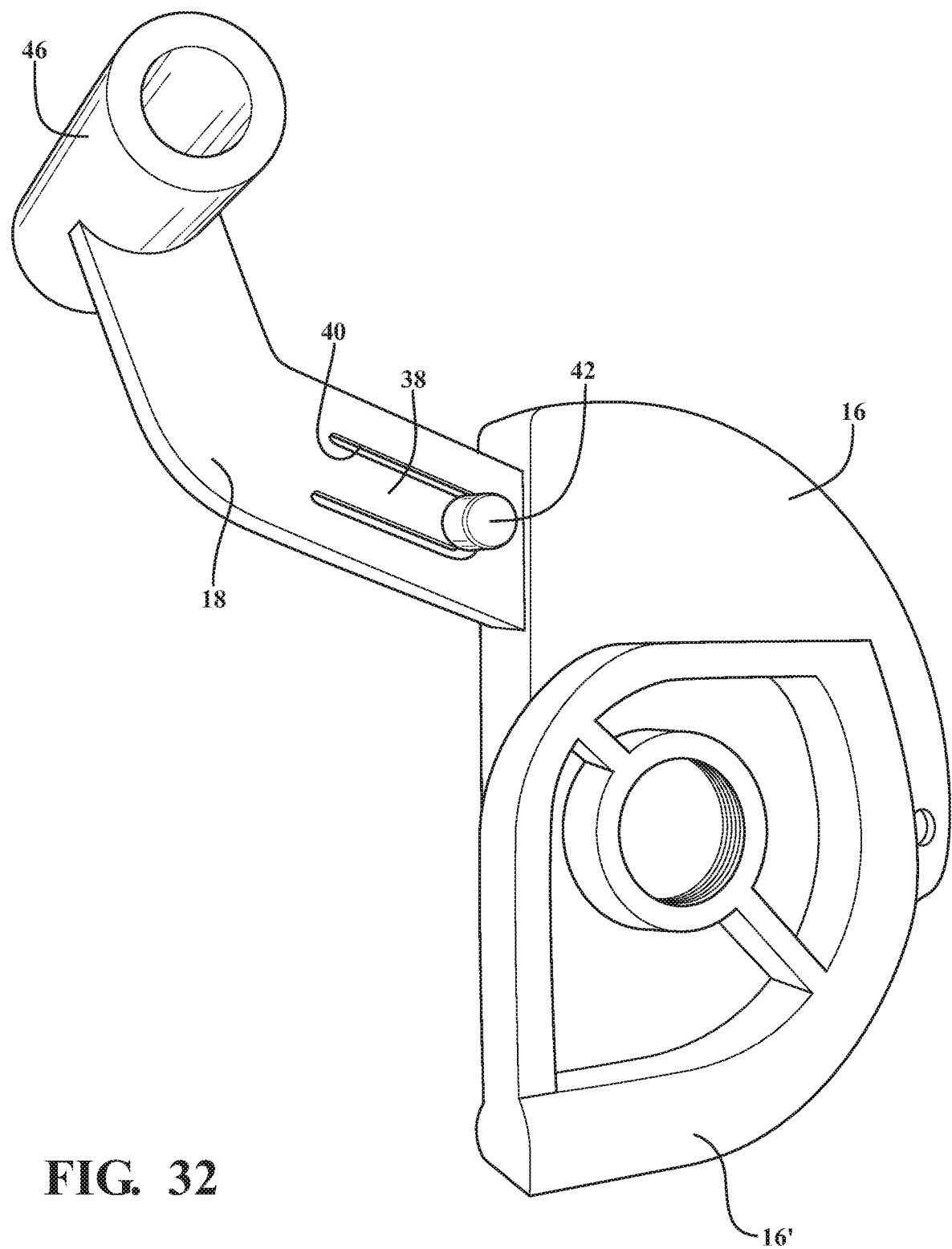
FIG. 32 is a perspective view of the handle and cam of FIGS. 30-31.

Referring again to FIG. 5, and as previously described, an exploded view of the manual park release mechanism again includes each of the upper 12 and lower 14 housing portions, combined handle 18 and cam (including main portion 16 and integral offset portion 16' for receiving the inner displaceable transmission cable 48), handle supported follower with integrated spring loaded arm 38 (again extending in slot at 40 with projection 42 as shown in FIGS. 30-32), and inter-rotationally supported key lock 32 and linearly displaceable slider 34 exhibiting a wedge or splined slider interface for influencing the projection 42 of spring arm 38 of the handle 18 out of engagement with the slot 58 supported within the lower housing 14.

Figure 6:
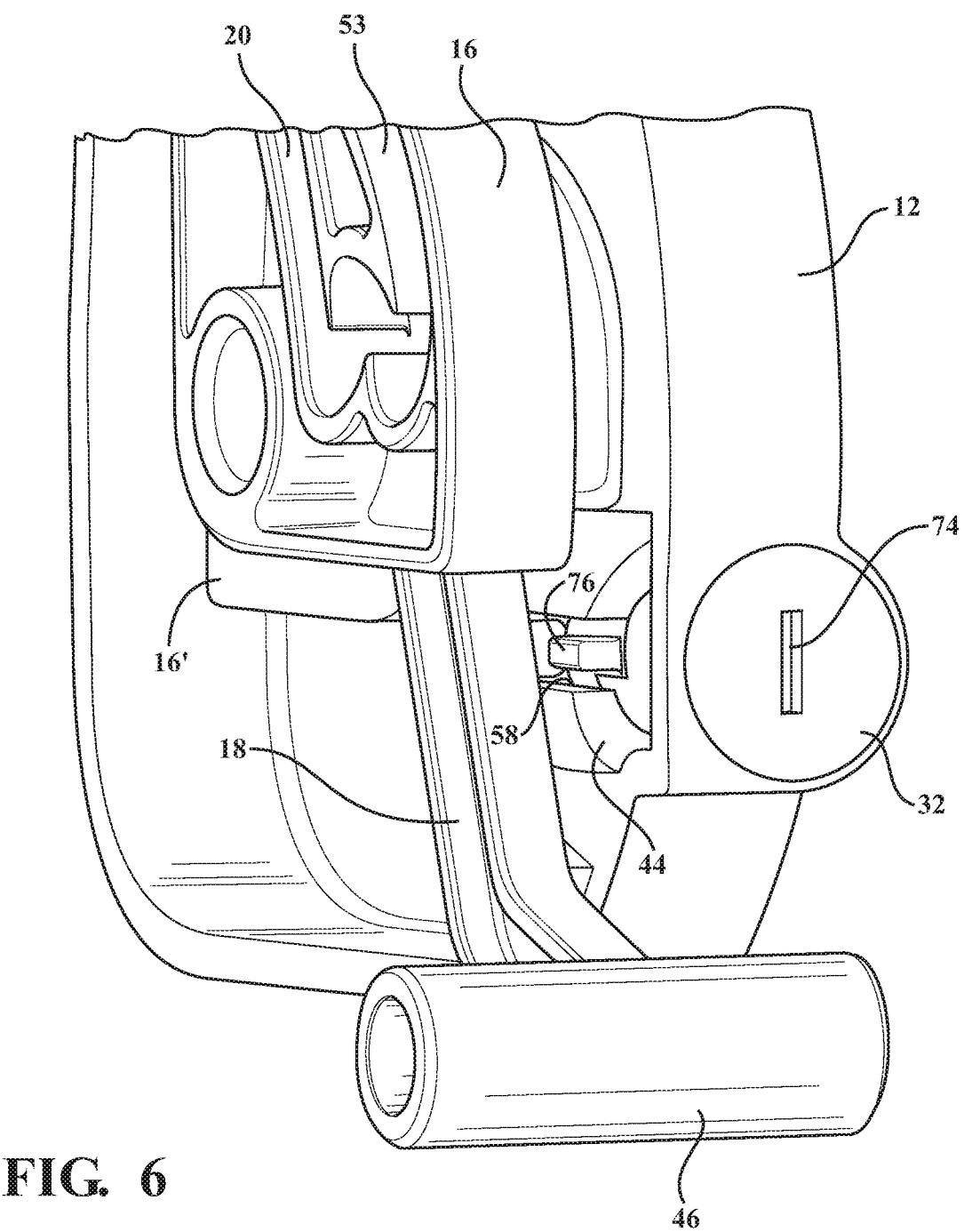
FIG. 6 is an enlarged partial perspective of the upper housing and cam/handle components and illustrating the spring lock arm engaged to the upper housing corresponding to the handle in a locked/Park position.
Figure 7:
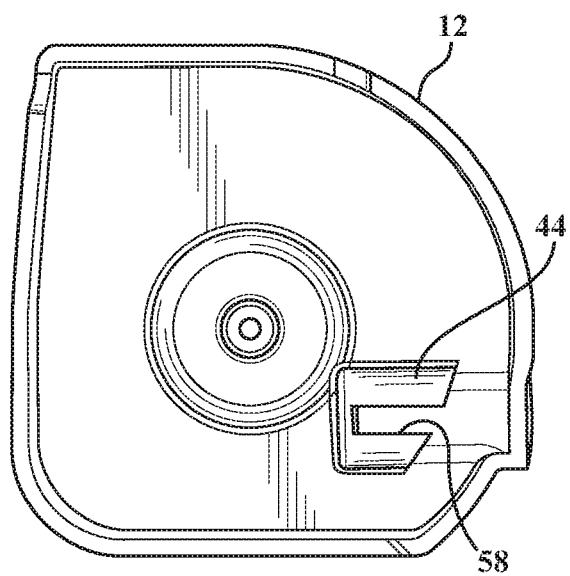
FIG. 7 is an inside plan view of the upper housing and depicting a receiving pocket for receiving the spring lock arm in the engaged position.

FIG. 6 is an enlarged partial perspective of the upper housing 12 and cam/handle components and illustrating the spring lock arm 38 again extending within the channel 40 configured in the handle 18 and exhibiting the side projecting lateral portion 42 engaged to the upper housing corresponding to the handle in a locked/Park position. FIG. 7 is an inside plan view of the upper housing 12 and depicting the inside receiving pocket (again at 44) configured within the first housing half 12 for receiving the projection 42 of the spring lock arm 38 in the engaged position.

Figure 8:
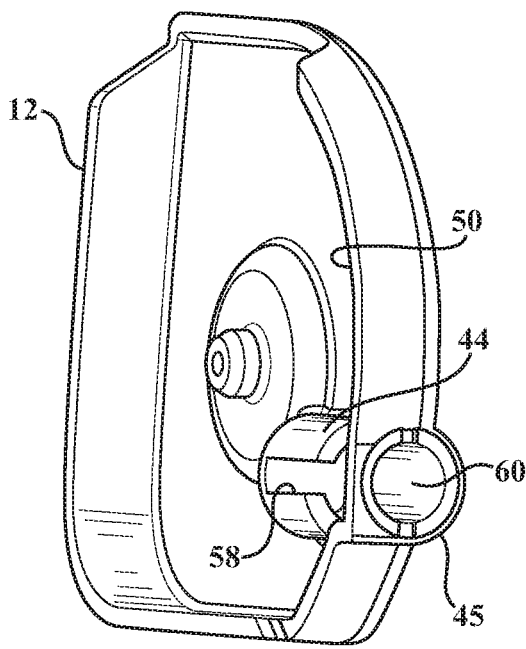
FIG. 8 is a further rotated view of the upper housing shown in FIG. 7 and depicting the slot formed in the receiving pocket for engaging the handle/cam integrated spring arm in the locked position.

FIG. 8 is a further rotated view of the upper housing shown in FIG. 7 and depicting the slot (see at 58) formed in the receiving pocket 44 for engaging the projecting portion 42 of the handle/cam integrated spring arm 38 configured within the pivotally supported arm 18 shown in the locked/Park position. FIG. 8 further shows the aperture receiving location 60, within which is seated the rotatable lock component 32.

Figure 9:
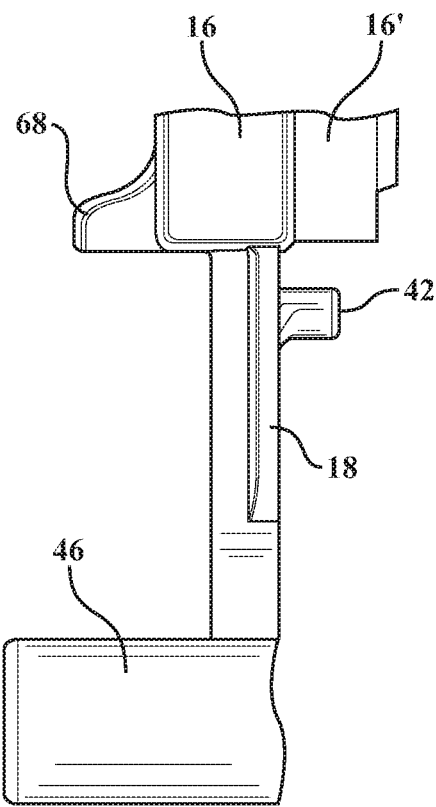
FIGS. 9 and 10 are a pair of front and side plan views of the cam integrated handle with spring lock arm for engaging the upper housing in the locked/Park position.
Figure 10:
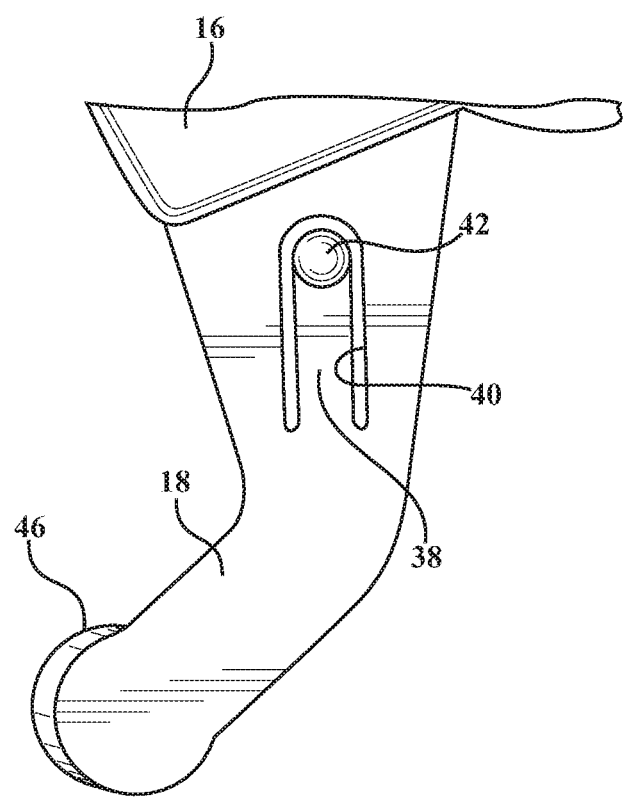

FIGS. 9 and 10 are a pair of front and side plan views of the cam integrated handle 18 and again showing the spring lock arm 38 for engaging the upper housing 12 in the locked/Park position. FIG. 11 is a further enlarged sectional and cutaway perspective of the spring lock arm 40 and cam handle 16 interfacing with the upper housing 12 supported rotatable lock 32 and linearly displaceable slider 34 in the locked/Park position. As better shown, the slider 34 includes a forward projecting post 62 which seats within a rear annular recess 64 of the rotatable lock component 32 for supporting the same and for permitting its guided rotational motion (such as a quarter turn to a counter clockwise direction 66) such as upon insertion of a key (not shown).

Figure 12:
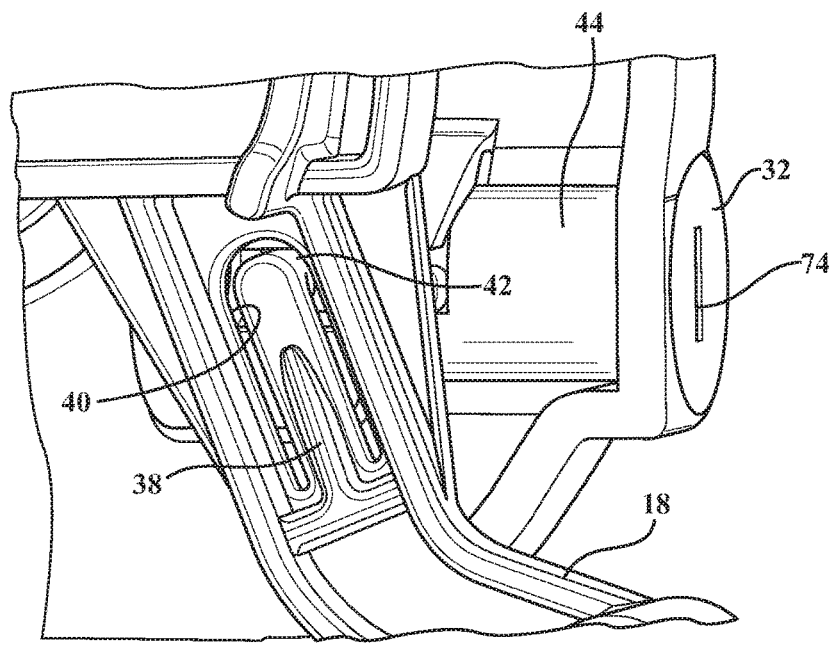
FIG. 12 is a rotated view of FIG. 11 and better showing the spring lock arm integrated into the combined handle and cam in the locked/Park position.
Figure 13:
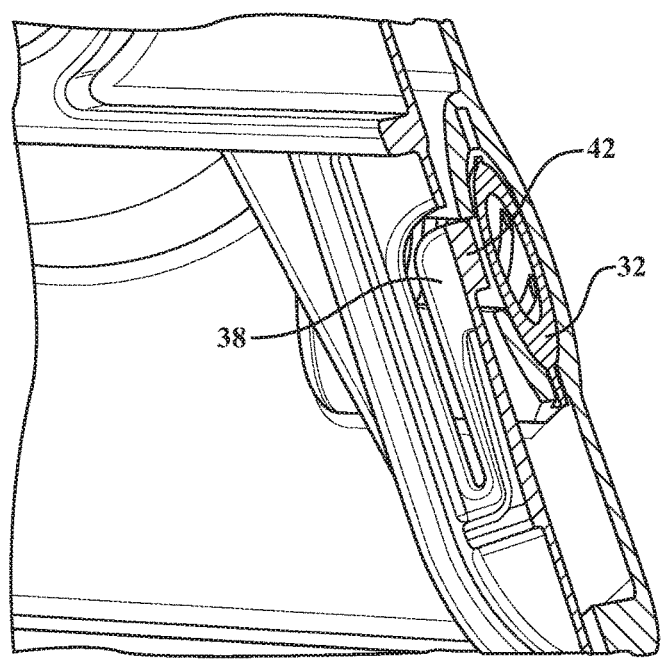
FIG. 13 is a further rotated position shown the handle supported spring lock arm engaged with the upper housing.
Figure 14:
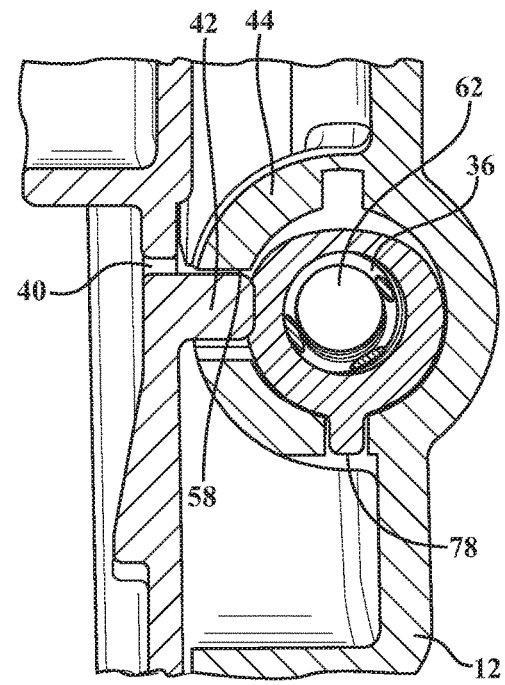
FIG. 14 is a further enlarged and sectional perspective of the spring lock arm engaged within the receiving pocket of the upper housing in the locked/Park position.

FIG. 12 is a rotated view of FIG. 11 and better showing the spring lock arm 38 integrated into the combined handle 18 and cam 16 in the locked/Park position. FIG. 13 is a further rotated position shown the handle supported spring lock arm 38 engaged with the upper housing 12 and FIG. 14 is a further enlarged and sectional perspective of the spring lock arm 38 engaged within the receiving pocket 44 and associated configured channel 58 defined in the upper housing portion 12 and in the locked/Park position.

FIG. 15 is s substantial repeat of the illustration of FIG. 6 and additionally showing the compression coil spring 28 which is biased by a pin feature 68 of the cam supported handle 18 in the locked/Park position (this pin feature 68 extending from a side of the handle 18 opposite the spring loaded feature 42). FIG. 16 is a rotated illustration of the lower housing 14 shown in FIG. 5 and better depicting the features of the guide component 24 with projecting portion 22 displace-ably mounted within the linear slot 26 associated with the lower housing and, in combination with the compression spring 28 supported within the arcuate track 30 of the lower housing, and which functions to reposition the handle unlock (FIG. 22), with subsequent full rotation of the handle 46 from the Park to unlock/Neutral positions requiring the operator to move the handle.

FIG. 17 is a side plan view of the mechanism as depicted in FIG. 15, again with the lower housing removed and further showing the pivoting handle 18 with pin feature 68 (see also at 68 in FIG. 9) seating the compression coil spring 28 in the locked/Park position. FIG. 18 is a repeat of the enlarged sectional perspective of FIG. 11, with FIG. 19 providing a rotated and enlarged partial exploded view of the rotating lock 32 and slider 34 components of FIG. 5 and better showing the wedge or splined interface (see opposing end profile surfaces 70 on the rotatable lock component 32 and at 72 for the slider 34). Upon a key or bit engaging a front recess 74 of the lock component 32, the component 32 is caused to rotate such as in the quarter turn counterclockwise direction depicted at 66 also previously in FIG. 11 for causing the slider 34 to telescope axially (see further linear arrow 75) in a compressing direction against the rear supported coil spring 36. The slider 34 further include a pair of winged locations 76/78 which define and limit its range of rear displacement along the slot 58 configured in the receiving pocket 44 of the upper housing portion 12.

Figure 20A:
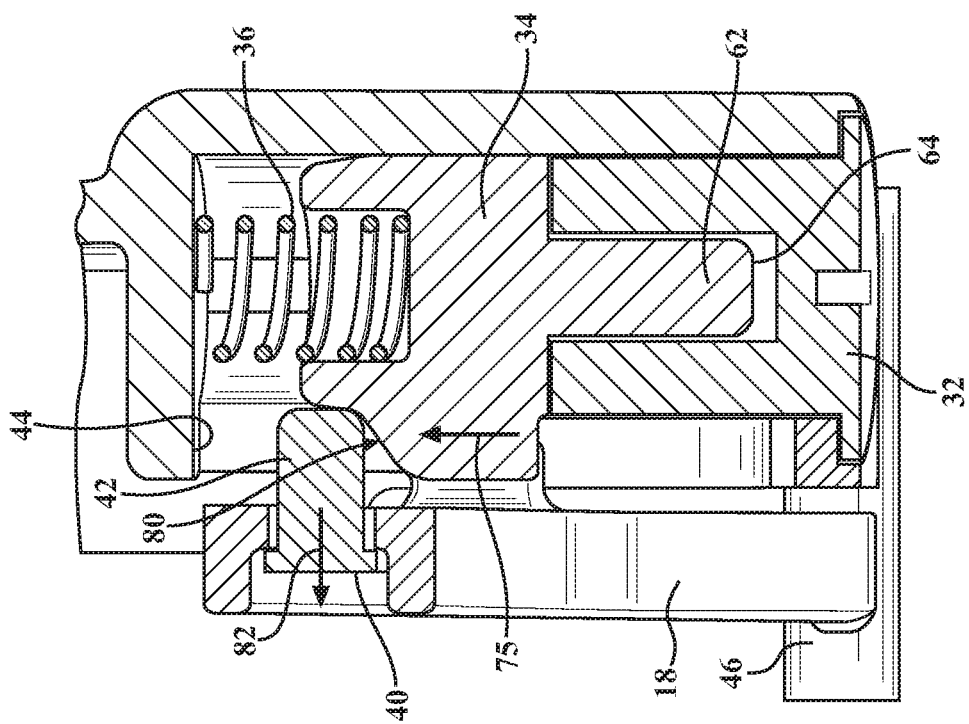
FIG. 20 is a repeat of FIG. 18 and FIG. 20A further is a plan cutaway view of the interface relationship between the lock, slider and compression spring for laterally influencing the handle integrated spring lock arm to unseat from the receiving pocket of the upper housing to permit the handle, cam and secured cable to be subsequently actuated to shift the vehicle from the locked/Park position.
Figure 20:
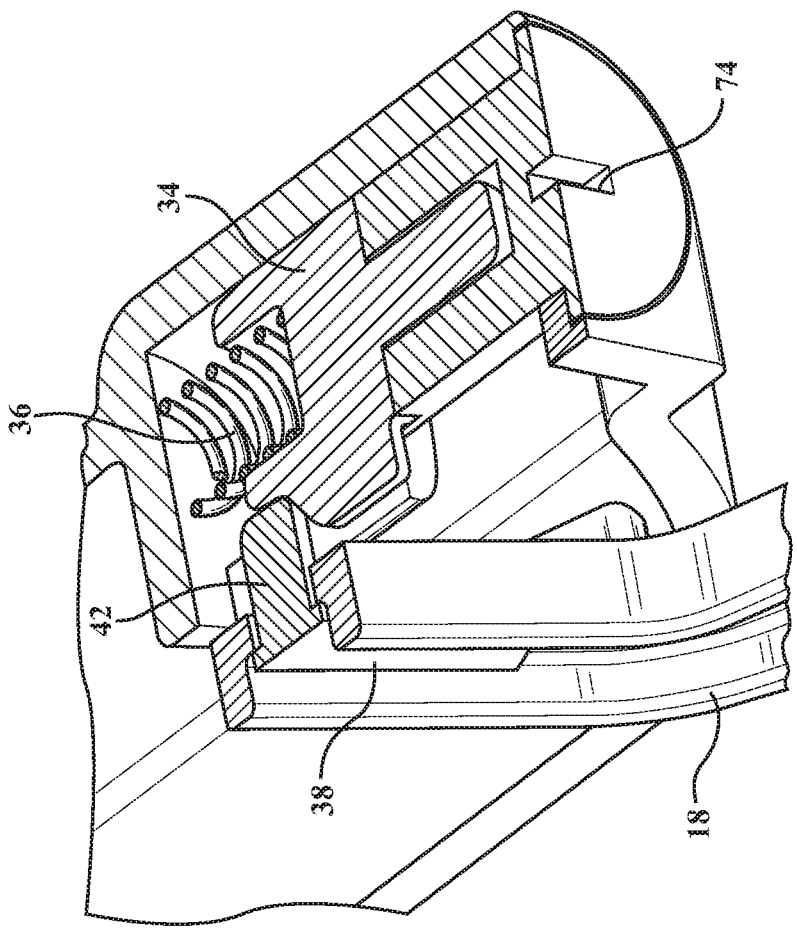

FIG. 20 is a repeat of FIG. 18 and FIG. 20A is a plan cutaway view of the interface relationship between the lock 32, slider 34 and inner supported compression spring 36 for laterally influencing the handle integrated spring lock arm 40 to unseat from the receiving pocket 44 of the upper housing 12 to permit the handle 18, cam 16 and secured inner translating portion 48 of the cable 5 (again FIG. 5) to be subsequently actuated to shift the vehicle from the locked/Park position. This is further depicted by ramped side wall 80 exhibited on the slider 34 which, upon displacing the slider axially rearwardly along previously identified directional arrow 75) in turn causes the spring loaded arm 40 integrated into the arm 18 to laterally displace in direction 82 until the projecting portion 42 of the spring arm 38 unseats from the upper housing 12 pocket 44 defined by the slot 58.

Figure 22:
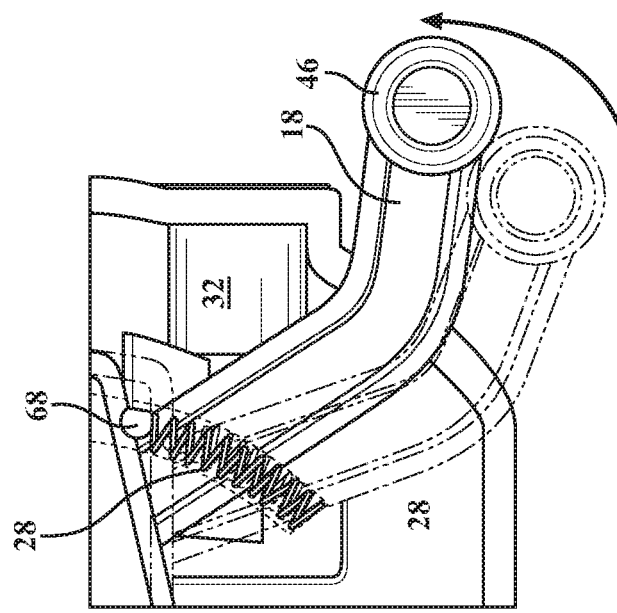
FIG. 22 is a similar view to FIG. 17 and showing the handle in a partially rotated and cable tensioning position resulting from unseating of the spring lock arm from the upper housing and resulting in the intermediate rest position of FIG. 23 and prior to the handle being subsequently actuated to the upward Park release (Neutral) position of FIG. 4.
Figure 21:
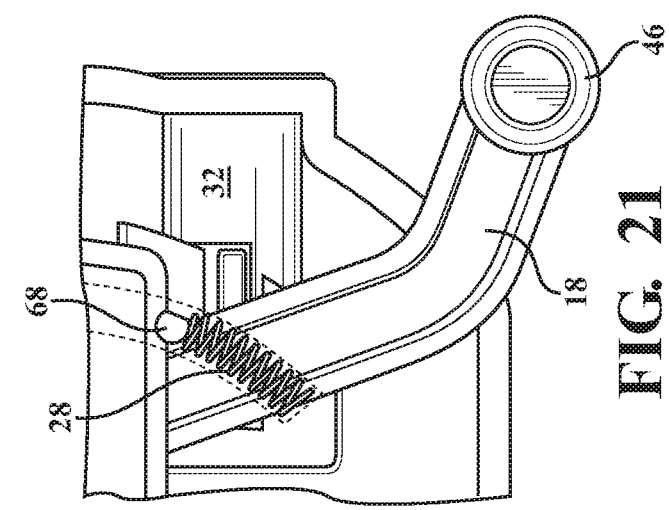
FIG. 21 is a repeat of FIG. 17.
Figure 24:
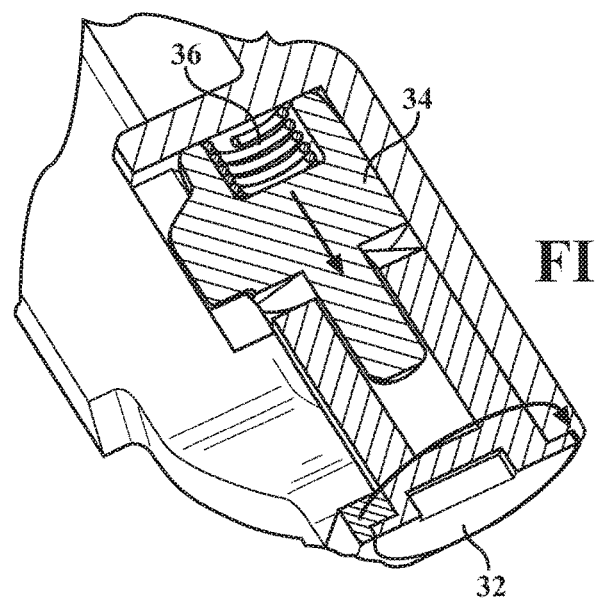
FIGS. 24-26 illustrate the rotating lock and slider components and compression spring from various angles along with the upper housing receiving pocket/channel for engaging the cam handle spring lock arm.
Figure 25:
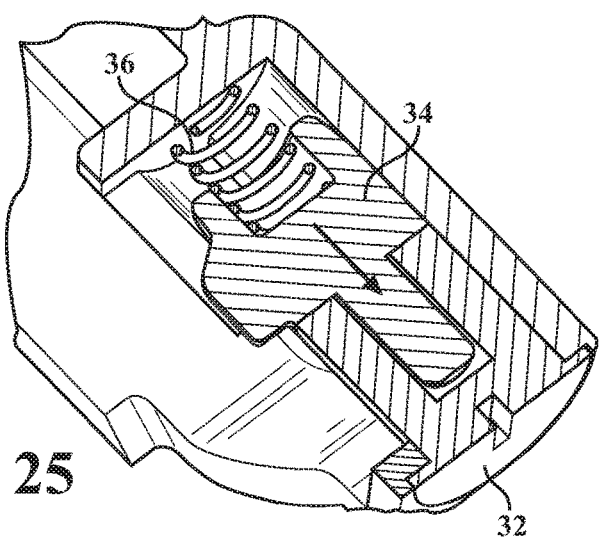
Figure 26:
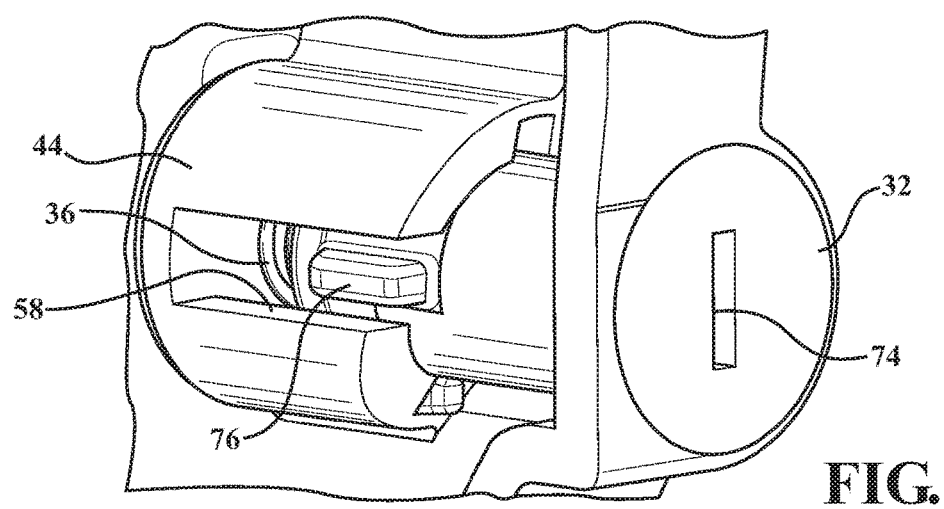

FIG. 21 is a repeat of FIG. 17 and FIG. 22 is a similar view showing the handle 18 in a partially rotated and cable slack take-up/tensioning position, this resulting from unseating of the spring lock arm 38 from the receiving pocket within the upper housing 12 and resulting in the intermediate rest position of FIG. 23 and prior to the handle being subsequently actuated to the upward Park release (Neutral) position of FIG. 4. FIGS. 24-26 further illustrate the rotating lock 32 and slider 34 components and compression spring 36 from various angles along with the upper housing 12 receiving pocket 44/channel 46 for engaging the projecting end portion 42 of the cam handle spring lock arm 38.

Figure 27:
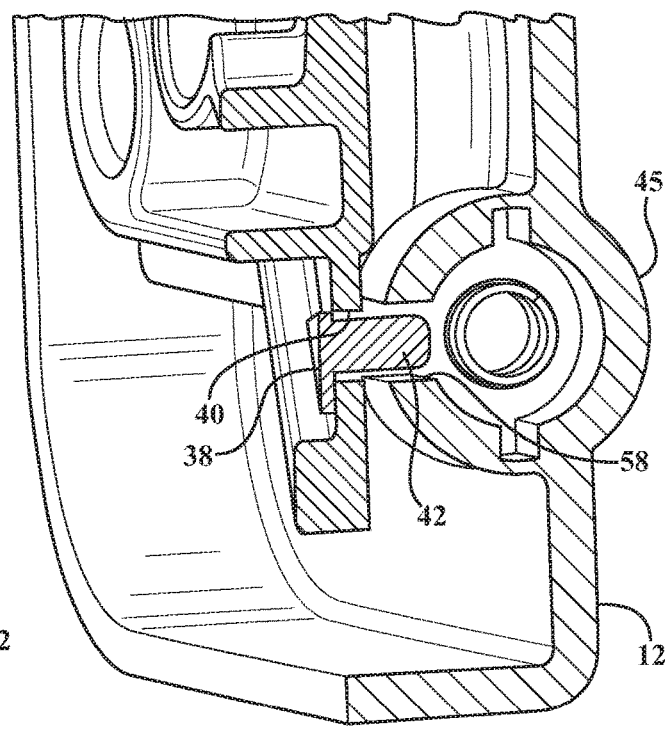
FIG. 27 is a similar illustration to FIG. 14 and illustrating the protocol for displacing the handle and cam component to the secondary lock (Neutral) position and then returning the spring lock arm to the engaged/Park position.

FIG. 27 is a similar illustration to FIG. 14 and illustrating the protocol for displacing the handle and cam component to the secondary lock (Neutral) position and then returning the spring lock arm to the engaged/Park position. This is also as shown and previously described in the cam track protocol in FIG. 30 and includes the handle 18 being initially pulled up to the secondary lock (e.g. Neutral) position of FIG. 4, following which it is again displaced to return to the Park position, at which the spring lock arm 38 with end projecting portion 42 re-engages the receiving pocket 44 of the upper housing 12.

Figure 23:
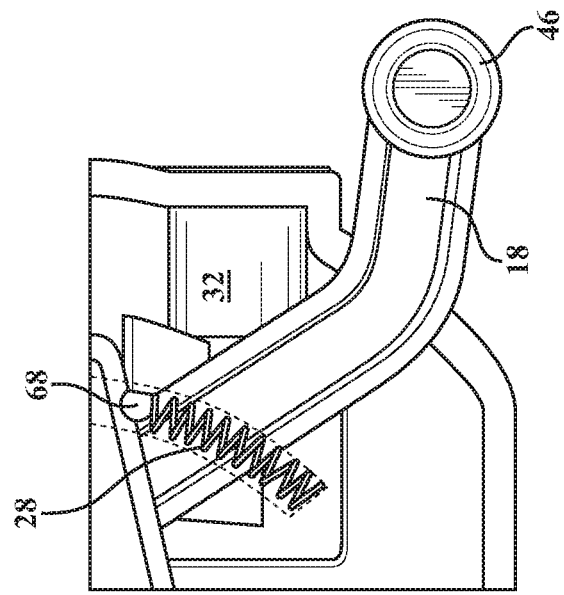
Figure 28:
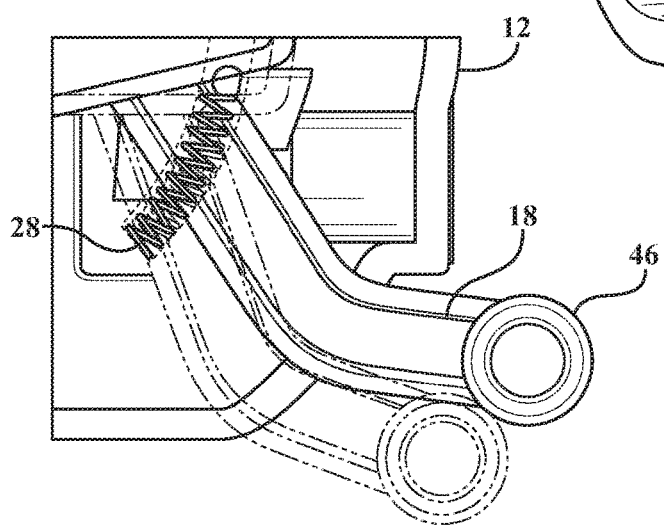
FIGS. 28 and 29 are similar to FIGS. 22 and 23 and illustrate a reverse protocol for returning the handle and cam to the locked/Park position.
Figure 29:
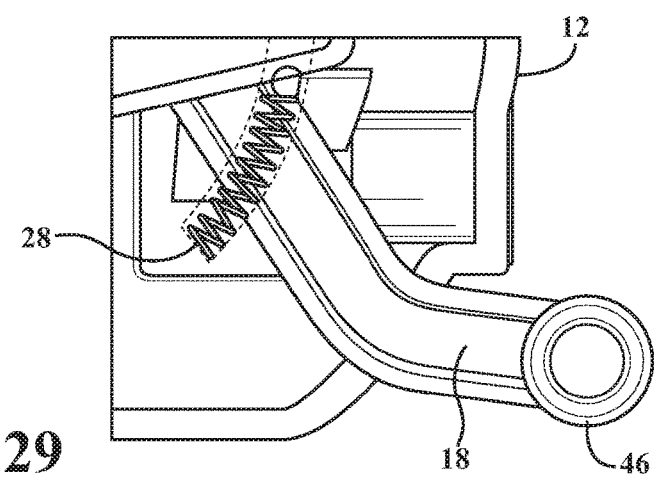

FIGS. 28 and 29 are similar to FIGS. 22 and 23 and illustrate a reverse protocol for returning the handle and cam returned to the locked/Park position. This includes the operator pushing down of the handle and lever arm (FIG. 28) to position the mechanism back into the locked/Park position (see again corresponding to cam track positions 56 to 54 in FIG. 30).

Figure 33:
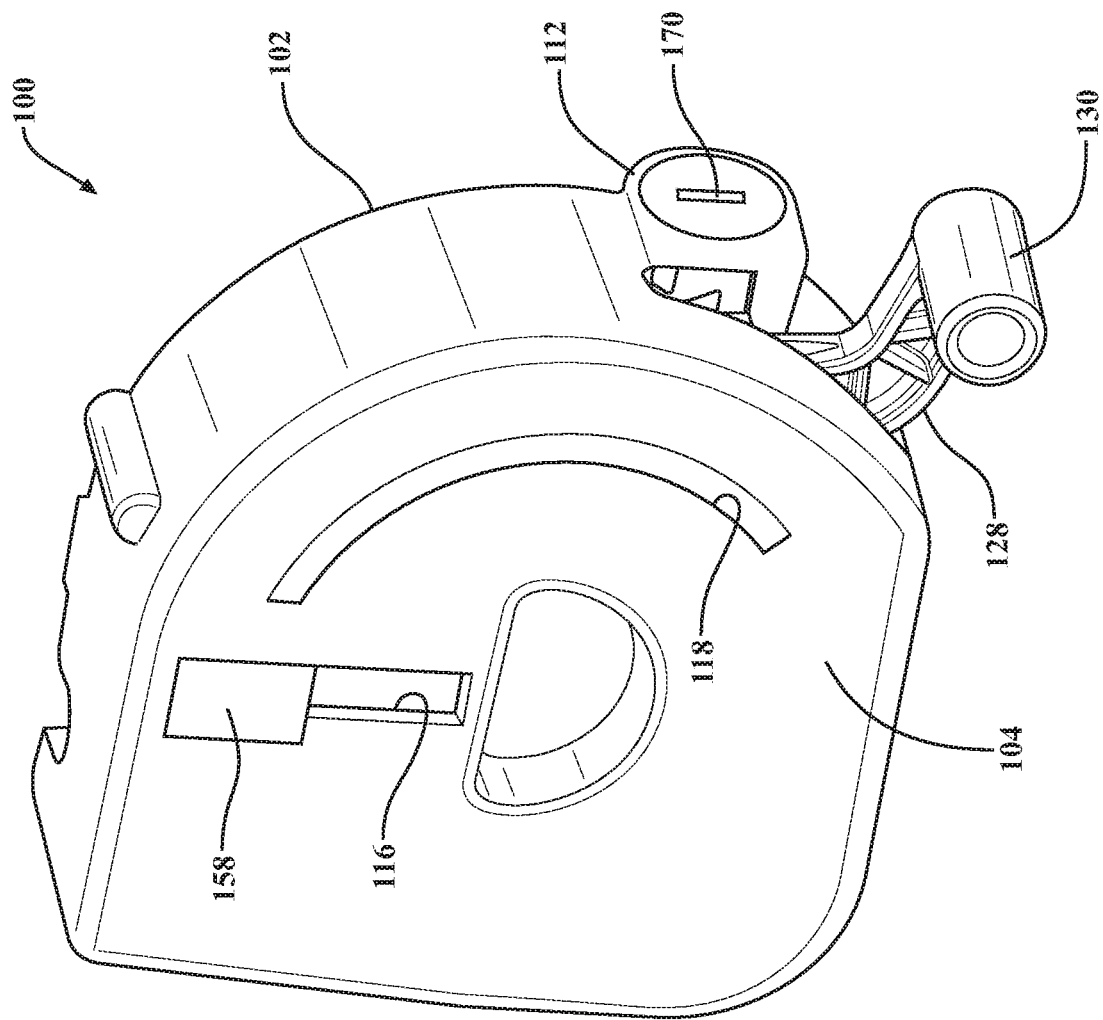
FIGS. 33-35 provide a series of illustrations of a handle mechanism assembly according to a second preferred embodiment of the present invention.
Figure 35:
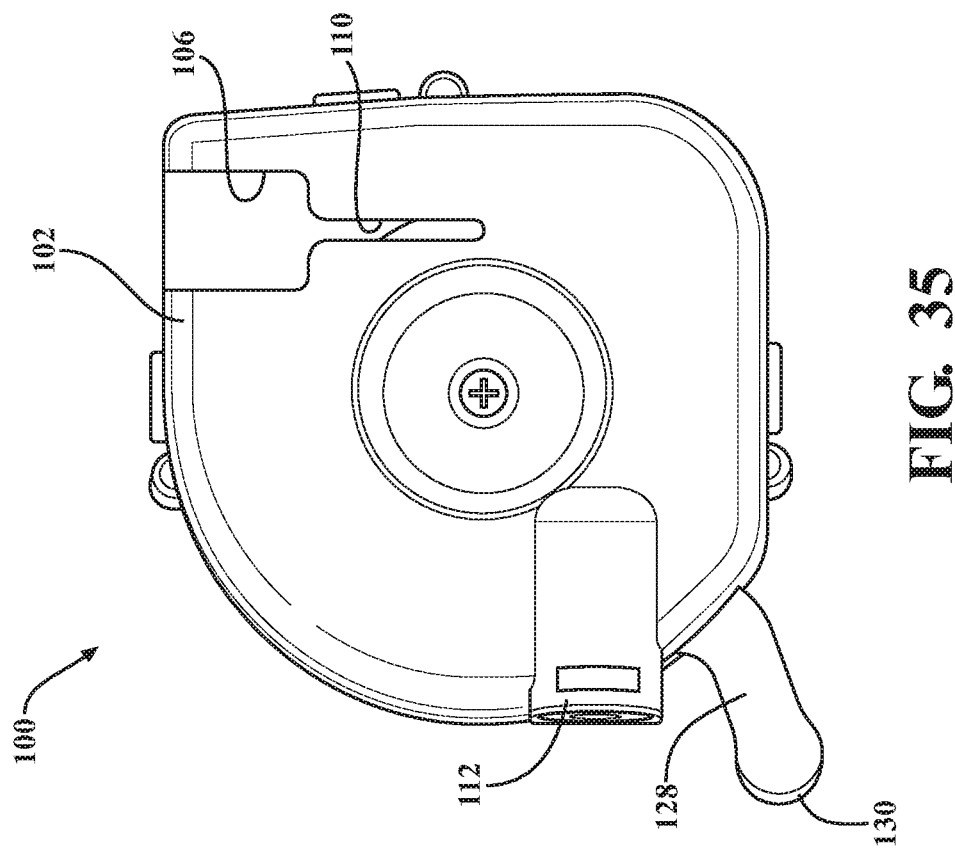
Figure 34:
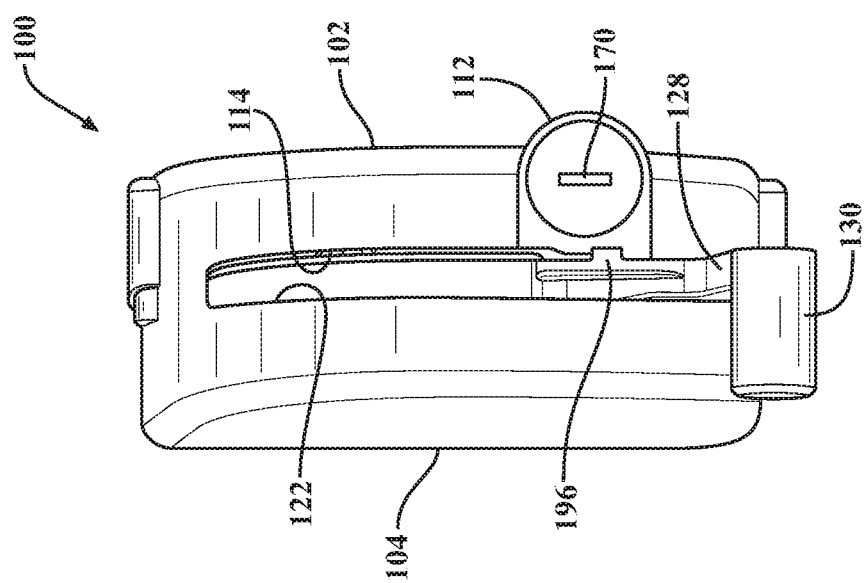

Proceeding now to FIGS. 33-35, a series of illustrations are again provided at 100 of a handle mechanism assembly according to a second preferred embodiment of the present invention. As with the handle mechanism 10 previously described, the assembly includes each of an upper housing portion 102 and a lower housing portion 104 constructed of any suitable material not limited to a polypropylene and which are inter-engaged in sandwiched fashion (such as by fasteners, sonic welding techniques or the like) to define a package space interior.

Figure 52:
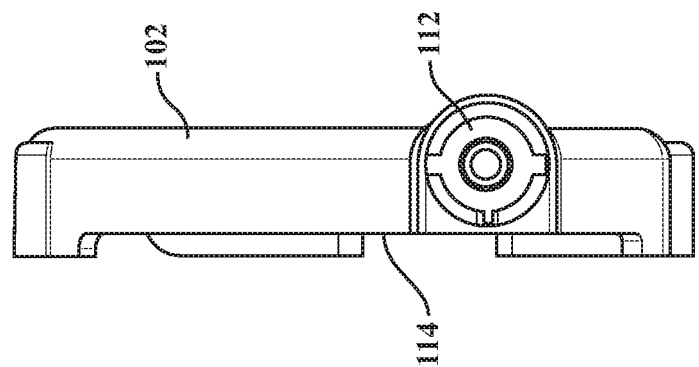
Figure 51:
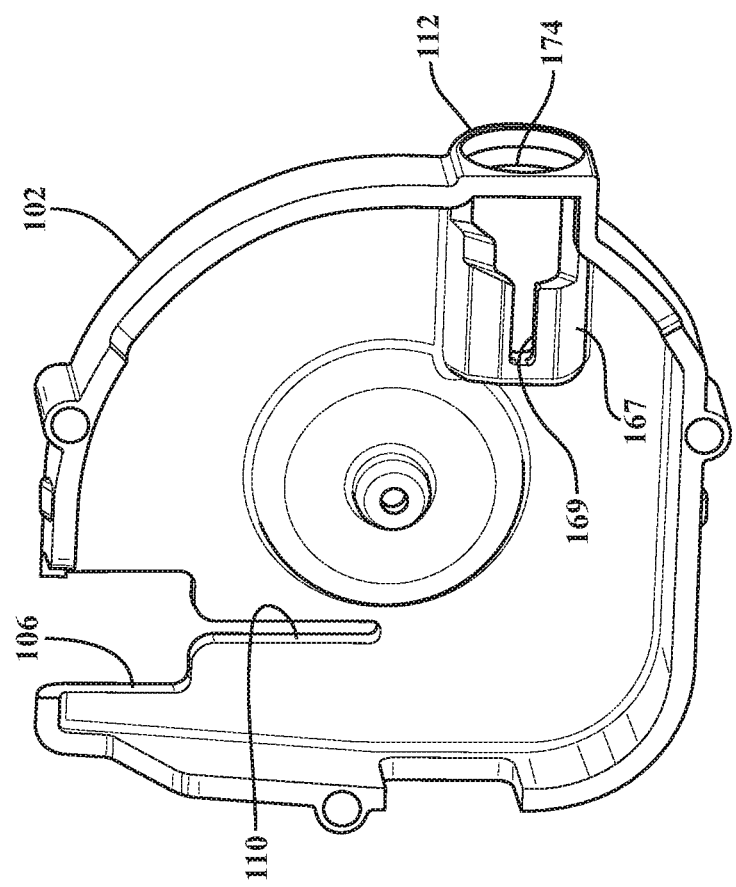

FIGS. 51-53 presents a series of first plan, side and second plan views, respectively, of the upper housing cover portion 102 (similar to as also shown in FIG. 39) and depicting an access window 106 configured in an upper end for receiving a translatable extending end (see as referenced at 108 in FIG. 43 which is shown outside of the arcuate path 150 of the cam within which it is seated) of the cable assembly for guided attachment to the cam and handle components, as hereinafter described. A further channel 110 is shown in each of FIGS. 51 and 53 which guides the extending end 108 of the translatable cable for engagement to the rotatable cam portion. Also shown at 112 is a receiving pocket configured in a forward face of the upper housing portion 102 for receiving the rotatable lock and slider components. The side plan view of FIG. 52 best illustrates a recessed surface 114 which partly defines the forward edge guide profile through which projects the handle portion of the cam.

Figure 37:
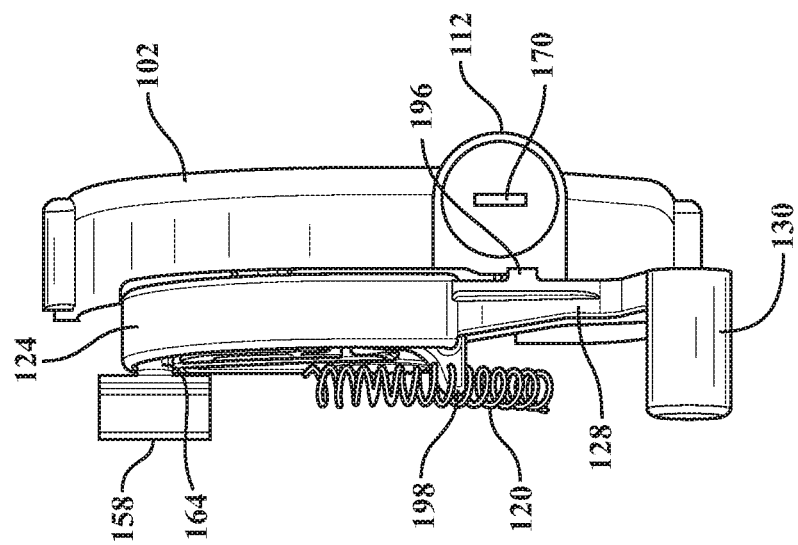
FIGS. 36-37 depict first and second rotated views of the handle assembly with the lower housing cover removed.
Figure 36:
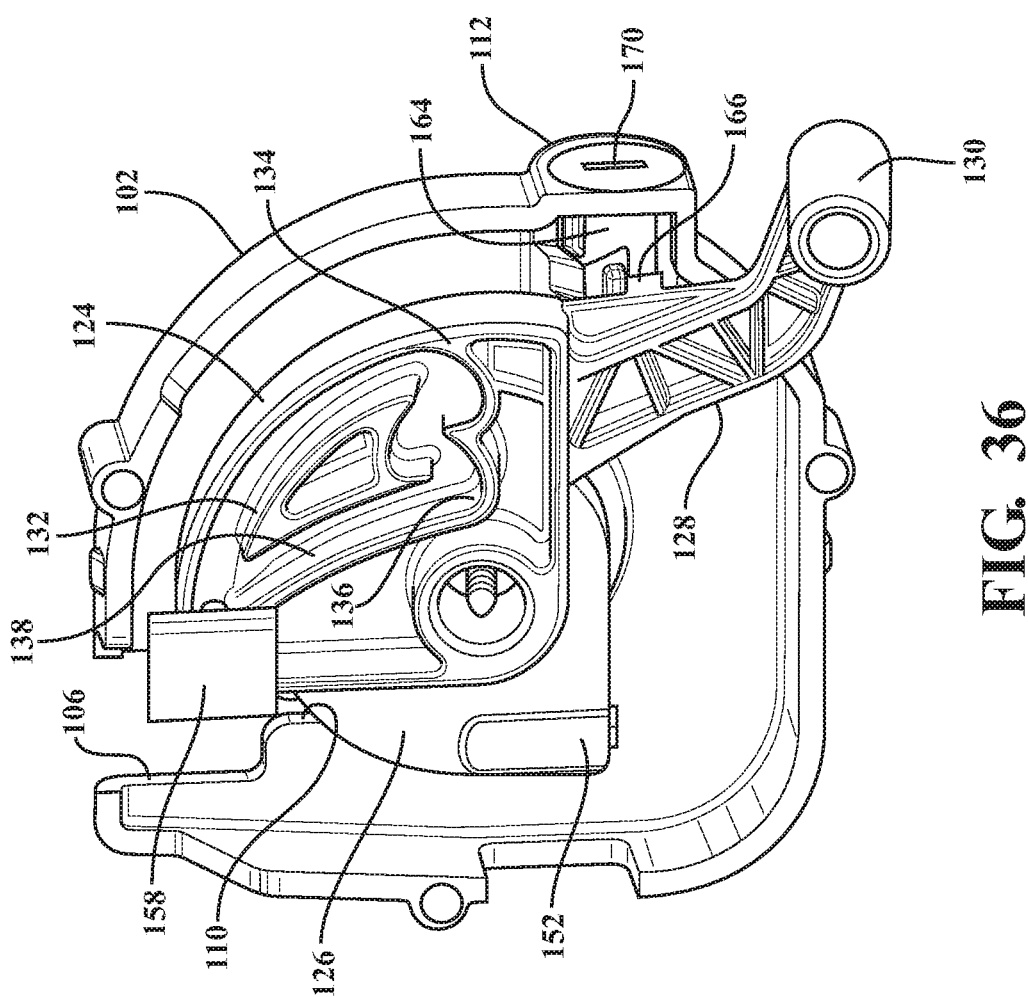
Figure 41:
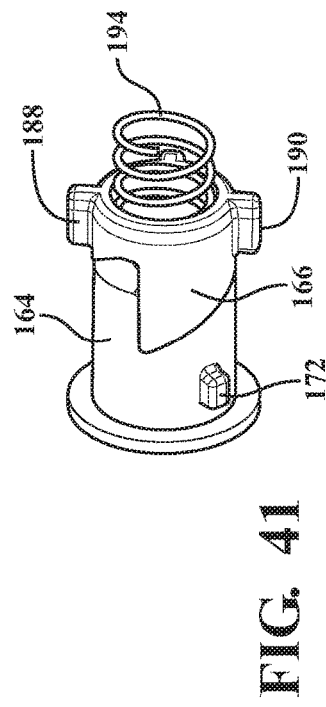
FIGS. 40 and 41 depict a pair of rotated views of the lock and spring loaded slider components and further depicting the splined relationship for linearly displacing the slider upon rotation of the lock in order to unseat and release the cam and handle for actuation between the Park and Neutral positions.
Figure 43:
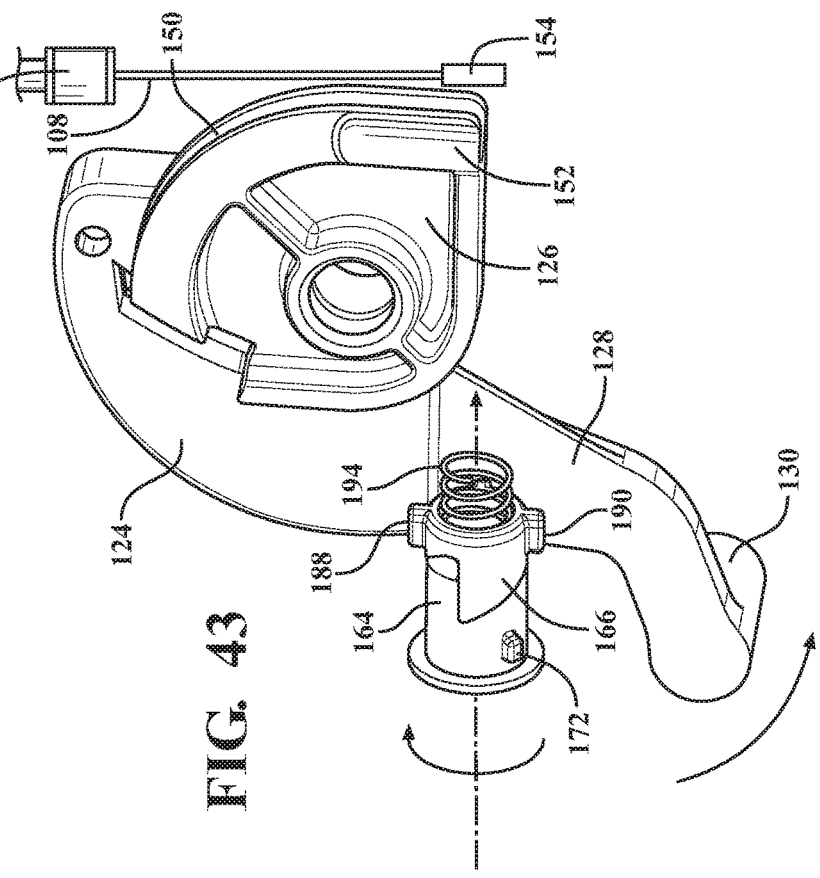
FIGS. 42 and 43 provide first and second rotated illustrations of the engagement interface established between the cam and handle with the lock/slider components and which, in response to a counterclockwise quarter turn, linearly displaces the slider from contact with the handle, allowing the cam and handle to pivot to the initial release position for subsequent actuation to a Park to Neutral position.
Figure 40:
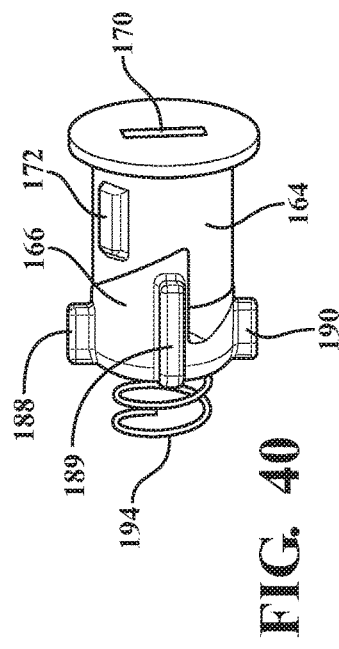
Figure 47:
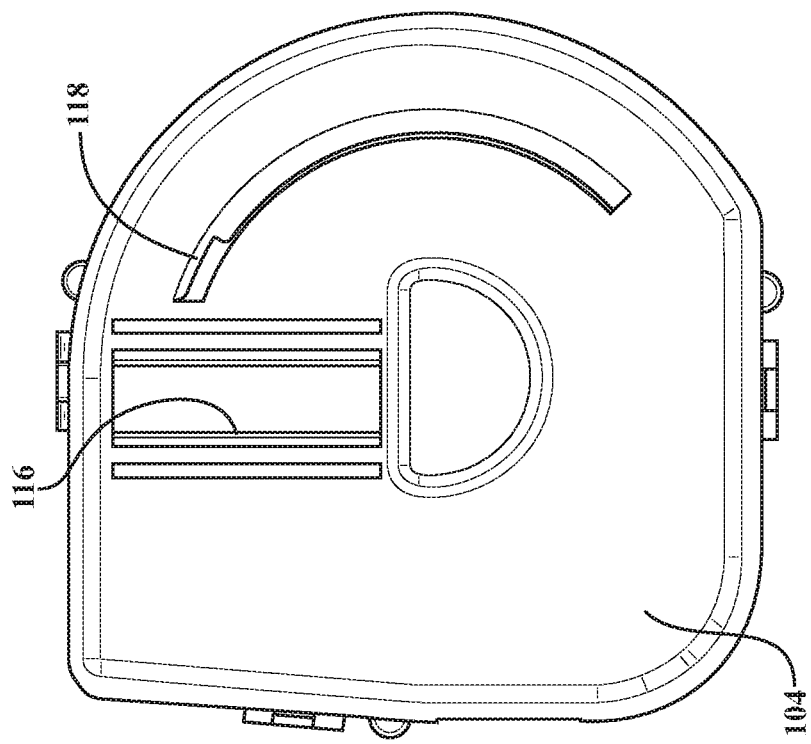
FIGS. 46 and 47 present first and second rotated perspective views of the lower housing cover and depicting each of the linear slot for receiving the CAM follower guide component as well as the arcuate track for receiving the compression spring for biasing the cam and handle between each of the initial release, Park to Neutral and Neutral to Park positions.
Figure 46:
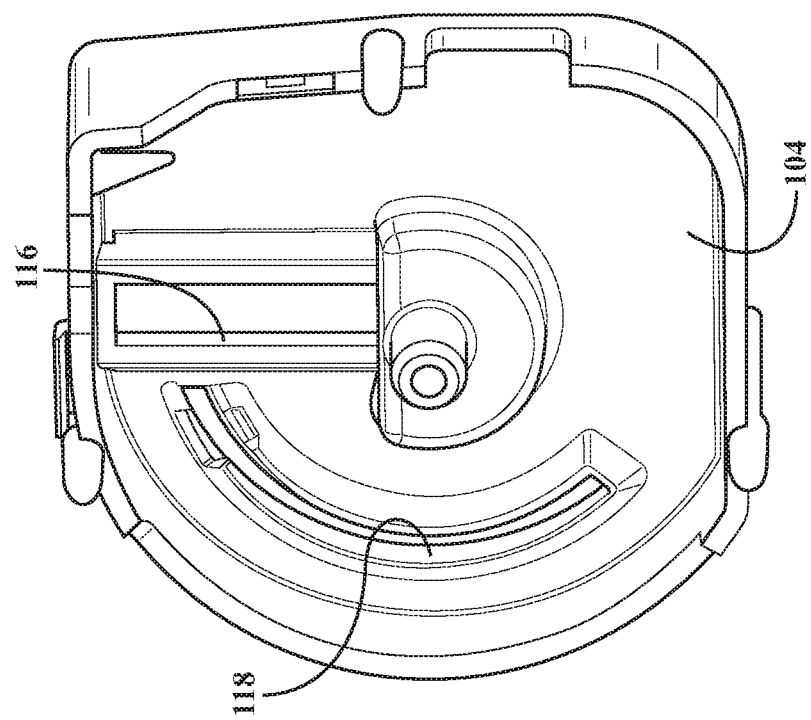
Figure 48:
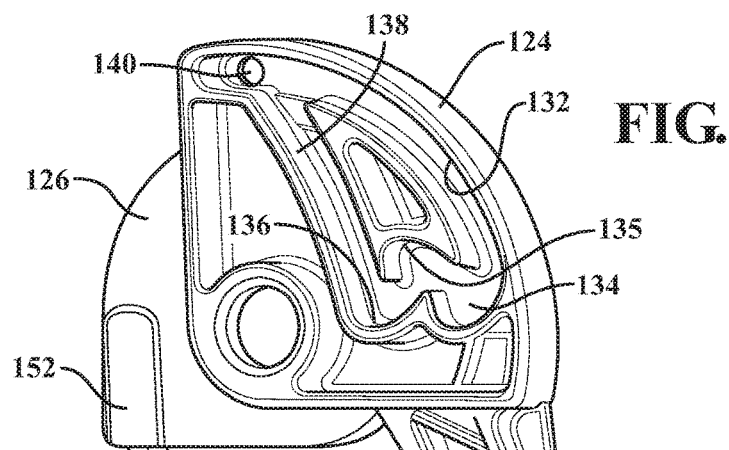
FIGS. 48-50 present a series of views of the cam and integrated handle, with FIG. 48 depicting a first plan view of the closed interior profile for guiding motion of the CAM follower guide component in combination with the linear slot in the lower housing cover, FIG. 49 depicting a side profile of the cam and handle and showing each of the first side projection for engaging the slider component in the Park engaged position, as well as the second side boss projection which is biased by the arcuate groove supported spring during actuation between each of the initial release, Park to Neutral and Neutral to Park positions, and FIG. 50 depicting a second reverse plan view showing the secondary offset cam portion for seating the extending and translatable end of the upper cable assembly.
Figure 49:
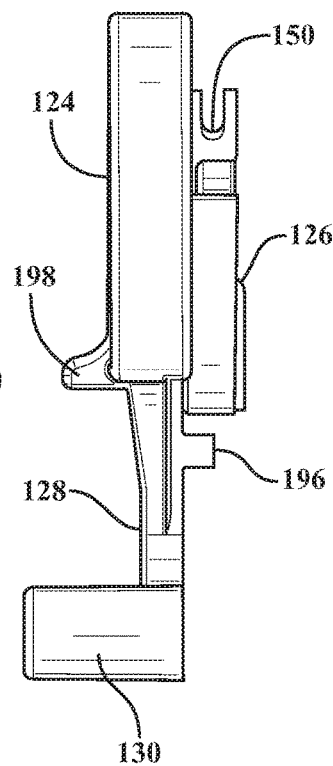
Figure 50:
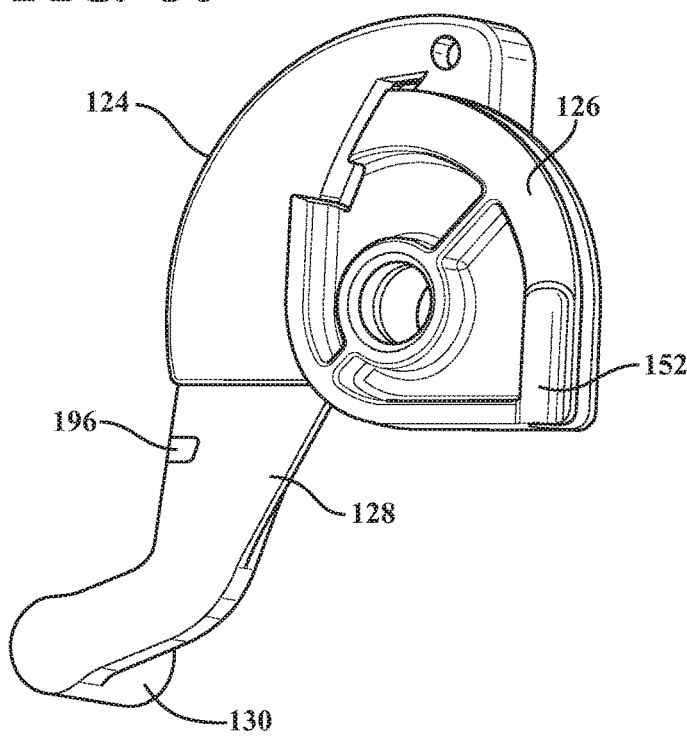

FIGS. 46 and 47 present first and second rotated perspective views of the lower housing cover 104 and depicting each of a linear slot 116 for receiving the CAM follower guide component, as well as an arcuate track 118 for receiving the compression spring 120 (see in FIGS. 36-37 depicting first and second rotated views of the handle assembly with the lower housing cover removed) for biasing the cam and integrally formed handle between each of the initial release, Park to Neutral and Neutral to Park positions. The forward view of FIG. 34 further depicts the forward recess surface 122 of the lower housing portion 104 which opposes that shown at 114 of the upper housing portion 102 for providing clearance for the cam handle.

A series of illustrations are provided, most notably in each of FIGS. 36-38, FIGS. 42-43 and FIGS. 48-50 and depicting the cam and integrated handle component. The cam portion includes a first portion 124 and a second offset portion 126 (compare to as shown at 16 and 16' in FIGS. 30-31). The cam handle is shown at 128 extends from the first cam portion 124 and terminates in a pull knob 130.

A closed perimeter profile is configured within a surface of the first cam portion 124 opposing the lower housing portion 104 and, as with the first embodiment, in proximity to the linear configured slot 116. Similar to as shown in the first embodiment, the cam profile includes am inner arcuate protuberance 133 which is bounded by the arcuate recessed profile including a series of interconnected and arcuate components with a first arcuate pathway 132, a pair of successive intermediate pull stop pathways 134 and 136, and a second return arcuate pathway 138.

As will be subsequently described with reference to the diagrammatic view of FIG. 60, interconnected pathways correspond to each of a Park lock position 140 (see also FIGS. 42 and 48), an initial unlock or cable tensioning take-up position 142 (an initial travel along first arcuate pathway 132 while remaining in the Park position), a pull handle to secondary lockout wall position 144 (continuing along arcuate pathway 132 to first intermediate arcuate bend 134 and also corresponding to position 52 in the related cam variant of FIG. 30), a release handle to Neutral lockout position 146 (see also abutting inner bend location 135 in FIG. 48 and out of park position 52' in the related variant of FIG. 30), a pull handle to secondary unlock position 148 (corresponding to second intermediate arcuate bend 136 as well as the unlocked and out of park position for returning to a pre-lock condition involving pushing down to reset as shown at corresponding location 56 in the variant of FIG. 30), a return to initial unlock position (along second arcuate pathway 138 back to the initial unlock position 142) and a return to the Park reset position 140 (upon re-engaging the lock and slider as will be described below).

Upon mounting the cam within the package housing, the offset cam portion 126 is positioned in proximity to the access window 106 and guide channel 110 for receiving the cable end 106. An arcuate receiving trench or groove 150 (see FIGS. 43 and 49) is formed along an upper edge of the offset cam portion 126 and within which the extending end of the inner translating cable 108 is received.

An engagement pocket 152 is configured at an underside end of the offset cam portion 126 in communication with the arcuate trench 150, with a lower clip end 154 of the inner cable 108 (see again FIG. 43) seating in the engagement pocket 152 and an upper fitting end 8 (compare again to FIG. 59) at an end of the outer fixed cable sheath securing within the access window 106 by appropriate fasteners or other locating structure such as further including a push and snap end fitting associated with a housing gage face/retention feature). In this fashion, the actuation of the cam and handle component results in displacement of the inner wire 108 relative to the fixed outer end fitting (see again FIG. 43) resulting in actuation of the transmission lever 4 in the manner previously described.

A CAM profile guide portion (see FIGS. 33, 36-37 and 44-45) is provided and includes a generally three dimensional main rectangular body 158 within which are formed opposite length extending recesses 160 and 162 (FIGS. 44-45) which are installed between the spaced apart sides of the linear slot 116 in the lower housing 104. A projecting portion 164 of the guide portion extends from the main body 158 and is seated within the closed and continuous cam profile network (see again components 132, 134, 136 and 138) for linearly displacing the guide portion along the linear slot 116 simultaneously with travel along the closed pathway components over the various cam and handle positions described in FIG. 60.

A rotatable lock 164 and linearly displaceable slider 166 are depicted as best shown in each of FIGS. 40-41 and 54-57. The lock includes a front circular face with a key slot passageway 170. A lock boss 172 extends within a window defined passageway 174 of the upper housing portion 102 (see FIG. 51) and, in response to insertion of a key or tool (not shown) facilitates a limited (such as quarter turn) rotation of the lock 164 in a desired direction (such as counterclockwise) until the lock boss 172 contacts an edge of the passageway 174.

As best further shown in FIG. 57, the lock 164 includes a pair of semi-circular splined or arcuate surfaces 176 and 178 which define ends surfaces of a stem 180 of the lock. An interior passageway is defined by an inner circular profile 182 (again in FIG. 57) and which is accessible between the arcuate surfaces 176/178.

The slider 166 exhibits a mating body with a linear post 184 (FIGS. 54-55) which seats within the inner circular profile 182 of the lock so that a further splined surface 186 is configured on an outer body surrounding the post 184. As further best shown in FIGS. 40-41, the opposing splined surfaces at 176/178 of the lock 164 and at 186 for the slider 166 mate during assembly of the lock and slider and installation within the upper housing portion receiving pocket 112.

The slider 166 further includes a further plurality of laterally extending slider bosses 188, 189 and 190. A rear of the slider 166 (see as best shown in FIG. 55) is recessed, at 192, for seating a coil spring 194 and for biasing the slider in a forward direction against the mating lock 164 once installed in the upper housing pocket 112.

Figure 42:
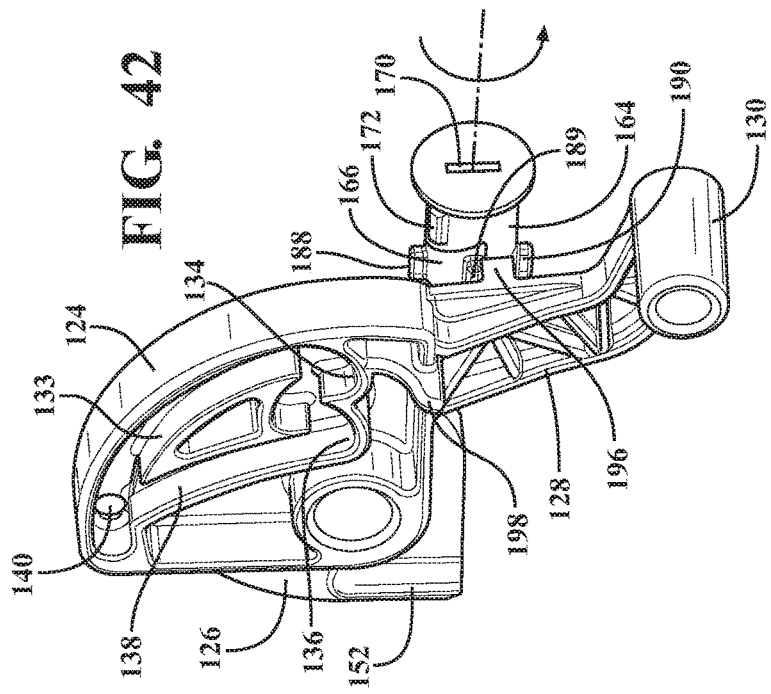
Figure 44:
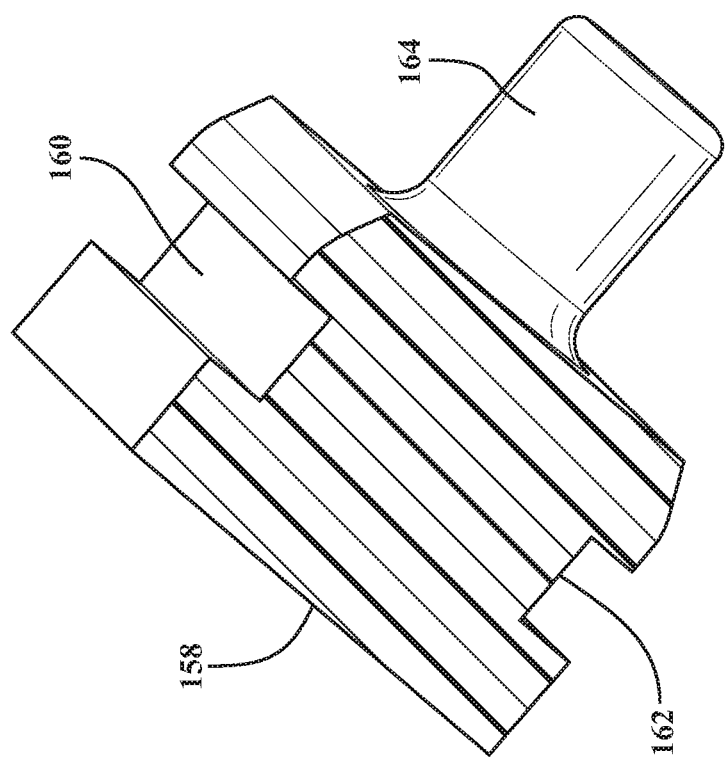
FIGS. 44 and 45 depict a pair of views of the CAM follower guide component, with FIG. 45 being a cutaway along line 45-45 of FIG. 44.
Figure 45:
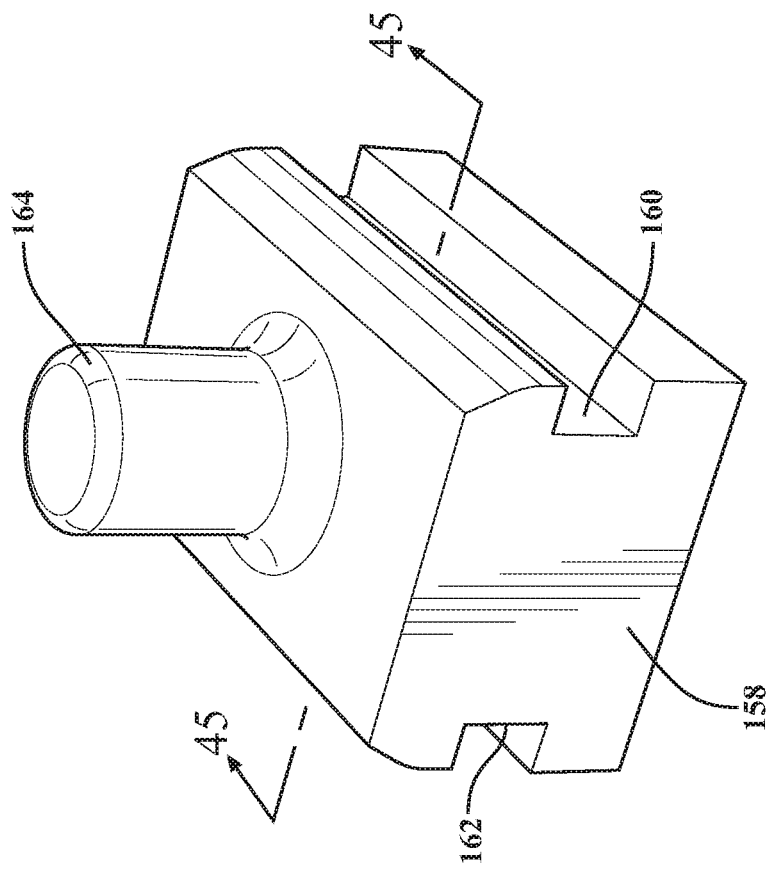

As best shown in FIG. 42, the cam handle 128 includes a first projection 196 which seats under succeeding slider boss 189 (as best shown in FIG. 42). A second projection 198 is configured on an opposite side of the handle 128 (see again each of FIGS. 37, 42 and 49) which is biased against an end of the arcuate compression spring 120 seated within the arcuate groove 118 of the lower housing portion 104.

Consistent with the description previously provided in the diagrammatic view of FIG. 60, the lock 164 is initially rotated a limited rotational direction (such as without limitation a ninety degree counterclockwise turn) whereupon the opposing and mating splined faces of the lock 164 (again at 176/178) and the slider 166 (again at 186) coact over the limitation rotational actuation of the lock 164 so that the slider is rearwardly displaced against the biasing force of the compression spring 194 and until the circumferentially spaced slider bosses (such as at 188 and 189) extend rearwardly from and clear of the first side projection 196 of the cam supporting handle 128. Upon this occurrence, the cam and handle is rotated up by the separate arcuate coil spring 120 acting upon the second side projection 198 of the cam handle from the original Park position 140 (FIG. 60) to the initial release position 142.

Following cycling of the cam between the Park and Neutral lockout positions, and upon execution of the handle pull up to the secondary lockout position (at 148 in FIG. 60) and subsequent return to the initial release position 142, the cam handle is pushed downward to relock into Park position 140, at which point the angled face of the cam handle projection 198 interfaces with the front face of the slider boss 189, causing the slider 166 to initially compress and, following clearance of the cam handle projection 196 from the slider face, the slider spring 194 reverse actuates the slider 168 forwardly into splined mating contact with the lock 164 to reestablish the initial locked position.

FIG. 38 is a further side plan view of the handle assembly and with the lower housing cover, CAM follower guide component and compression spring removed and depicting the engagement of the extending end 8 of the upper cable assembly 5 through the access window defined in the upper housing cover and to the cam component. An advantage of the present design allows for easier removal of the cable connection 156 and inner translating wire 108 (again FIG. 43) from the handle mechanism (via the access window configuration 106 and extending channel 110). This allows for removal and replacement of a damaged handle mechanism 100, without also necessitating removal of an otherwise undamaged upper cable assembly 5 and which is often necessary in prior art designs.

FIG. 39 is a further succeeding view of FIG. 38 with the cam component removed and depicting the upper housing cover 102 in combination with the lock 164 and slider 166 components. A pocket 167 is configured within the housing cover 102 and includes a slot 169 for seating the boss 189 of the slider 166. FIGS. 42 and 43 again provide first and second rotated illustrations of the engagement interface established between the cam and handle with the lock/slider components and which, in response to a counterclockwise quarter turn, linearly displaces the slider 166 from contact with the handle 128, allowing the cam and handle to pivot to the initial release position for subsequent actuation to a Park to Neutral positions.

FIGS. 48-50 again present a series of views of the cam and integrated handle, with FIG. 48 depicting a first plan view of the closed interior profile for guiding motion of the CAM follower guide component 158 in combination with the linear slot 116 in the lower housing cover portion 104, FIG. 49 depicting a side profile of the cam and handle and showing each of the first side projection 196 for engaging the slider component 166 in the Park engaged position, as well as the second side boss projection 198 which is biased by the arcuate groove supported spring 120 during actuation between each of the initial release, Park to Neutral and Neutral to Park positions, and FIG. 50 depicting a second reverse plan view showing the secondary offset cam portion 126 for seating the extending and translatable end 108 of the upper cable assembly.

Having described our invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings are have been described in detail, various alternative designs and embodiments exist for practicing the disclosure defined in the appended claims.

The invention claimed is:

1. A release mechanism for a vehicle, comprising:
 a housing, within which is supported a rotatable cam with a projecting handle;
 said housing further including a pair of housing portions, a passageway defined between said housing portions through which projects said cam handle;
 a cable secured at one end to said cam and adapted to secure at an opposite end to a transmission of the vehicle;
 an unlock component incorporated into said housing in communication with said handle and, upon actuating said unlock component, allowing manual manipulation of said handle and cam to shift the vehicle between Park and Neutral positions; and
 said unlock component further including a combination rotational lock component incorporated into a first of said housing portions and defining an end splined interface with an opposing and rearwardly positioned slider, a first spring located behind said slider for counter-biasing said slider in a direction towards said lock component.

2. The release mechanism of claim 1, said handle further incorporating a spring arm with a projecting portion seating through a channel configured in said upper housing and biased against a tapered surface of said slider component such that inward displacement of said slider results in unlocking of said spring arm, handle and cam from said upper housing.

3. The release mechanism of claim 1, said handle further comprising a first projection engaging one or more slider bosses in the Park position.

4. The release mechanism of claim 3, said handle further comprising a second projection extending opposite said first projection.

5. The release mechanism of claim 1, further comprising a second coil spring supported in an arcuate track configured within said lower housing portion and biasing said handle to a cable tensioning take-up position upon disengaging from said slider.

6. The release mechanism of claim 1, further comprising a closed profile exhibited on a surface of said cam and within which is received a projecting portion of a cam follower guide component mounted within a linear slot configured in a surface of said housing overlaying said closed profile.

7. The release mechanism of claim 1, further comprising a front recess adapted for receiving either a key or tool bit for actuating said unlock component.

8. A release mechanism for manually disengaging a vehicle transmission from a Park position, a lower cable assembly extending from said transmission and interconnecting with an upper cable assembly extending through a vehicle foot wall separating a passenger compartment from the transmission, said mechanism comprising:

a housing having a pair of portions defining a package space for receiving a rotatable cam with a projecting handle;

a cable secured at one end to said cam and adapted to secure at an opposite end to a transmission of the vehicle;

a closed profile exhibited on a surface of said cam and within which is received a projecting portion of a cam follower guide component mounted within a linear slot configured in a surface of said housing overlaying said cam profile; and an unlock component incorporated into said housing in communication with said handle and, upon actuating said unlock component, allowing manual manipulation of said handle and cam to shift the vehicle out of the Park position.

9. The release mechanism of claim 8 said unlock component further comprising a combination rotational lock component incorporated into said upper housing and defining an end splined interface with an opposing and rearwardly positioned slider, a first spring located behind said slider for counter-biasing said slider in a direction towards said lock component.

10. The release mechanism of claim 9, further comprising a second coil spring supported in an arcuate track configured within said lower housing portion and biasing said handle to a cable tensioning take-up position upon disengaging from said slider.

11. The release mechanism of claim 8, said handle further comprising a first projection engaging one or more slider bosses in the Park position.

12. The release mechanism of claim 11, said handle further comprising a second projection extending opposite said first projection.

13. The release mechanism of claim 8, further comprising a front recess adapted for receiving either a key or tool bit for actuating said unlock component.

14. The release mechanism of claim 8, said closed profile further comprising a series of interconnected and arcuate components with a first arcuate pathway, a pair of first and second successive intermediate pull stop pathways and a second return arcuate pathway.

15. A release mechanism for a vehicle, comprising:

a housing, within which is supported a rotatable cam with a projecting handle;

a cable secured at one end to said cam and adapted to secure at an opposite end to a transmission of the vehicle;

an unlock component incorporated into said housing in communication with said handle and, upon actuating said unlock component, allowing manual manipulation of said handle and cam to shift the vehicle between Park and Neutral positions; and a closed profile exhibited on a surface of said cam and within which is received a projecting portion of a cam follower guide component mounted within a linear slot configured in a surface of said housing overlaying said closed profile.

* * * * *